United States Patent
Wu

(10) Patent No.: US 12,061,569 B2
(45) Date of Patent: Aug. 13, 2024

(54) BLOCKCHAIN DATA ARCHIVING METHOD, APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventor: Xiaolong Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 162 days.

(21) Appl. No.: 17/703,085

(22) Filed: Mar. 24, 2022

(65) Prior Publication Data

US 2022/0214995 A1    Jul. 7, 2022

Related U.S. Application Data

(63) Continuation of application No. PCT/CN2021/080371, filed on Mar. 12, 2021.

(30) Foreign Application Priority Data

Apr. 24, 2020  (CN) .......................... 202010329695.3

(51) Int. Cl.
*G06F 16/11*   (2019.01)
*G06F 11/14*   (2006.01)
*G06F 16/178*  (2019.01)

(52) U.S. Cl.
CPC ........ *G06F 16/113* (2019.01); *G06F 11/1464* (2013.01); *G06F 16/178* (2019.01); *G06F 2201/84* (2013.01)

(58) Field of Classification Search
CPC .. G06F 16/113; G06F 16/178; G06F 11/1464; G06F 2201/84
See application file for complete search history.

(56) References Cited

U.S. PATENT DOCUMENTS 10,579,643 B2    3/2020  Madisetti et al.
2019/0278852 A1*  9/2019  Jayachandran ....... H04L 9/0643
(Continued)

FOREIGN PATENT DOCUMENTS

CN    103150232 A    6/2013
CN    107526775 A   12/2017
(Continued)

OTHER PUBLICATIONS

Decision to Grant a patent issued on Japanese Application 2022-539416, dated Jun. 29, 2023, translation, 2 pages.
(Continued)

*Primary Examiner* — Allen S Lin
(74) *Attorney, Agent, or Firm* — Crowell & Moring LLP

(57) ABSTRACT

This application provides methods, apparatus, electronic devices, and computer-readable storage medium for archiving blockchain data. One method includes synchronizing, by a first committing node, blockchain data with a consensus node, and determining a synchronization block height of the synchronized blockchain data, the synchronized blockchain data comprising state data; determining target state data required by a current transaction in the state data, and backing up the target state data; generating a state data snapshot of the synchronization block height according to the backed-up target state data, and transmitting the state data snapshot, the synchronization block height, and signature information of the first committing node to a second committing node as archiving point information; receiving endorsement information of the second committing node for the archiving point information; and archiving the synchronized blockchain data according to the endorsement information and the archiving point information.

17 Claims, 18 Drawing Sheets

(56) References Cited

U.S. PATENT DOCUMENTS

| | | | |
|---|---|---|---|
| 2020/0026712 A1 | 1/2020 | Madisetti et al. | |
| 2020/0073962 A1* | 3/2020 | Natarajan | H04L 9/0643 |
| 2020/0120157 A1* | 4/2020 | Xie | H04L 9/0643 |
| 2020/0389318 A1* | 12/2020 | Irazabal | H04L 9/0643 |
| 2020/0394154 A1* | 12/2020 | Blackshear | H04L 9/0637 |
| 2021/0049601 A1* | 2/2021 | Yang | G06Q 20/401 |
| 2021/0200750 A1* | 7/2021 | Zhang | G06F 16/27 |
| 2021/0273807 A1* | 9/2021 | Wertheim | G06F 9/466 |
| 2022/0407725 A1* | 12/2022 | Chai | G06F 16/13 |

FOREIGN PATENT DOCUMENTS

| | | |
|---|---|---|
| CN | 109189853 A | 1/2019 |
| CN | 109347941 A | 2/2019 |
| CN | 109656873 A | 4/2019 |
| CN | 110011788 A | 7/2019 |
| CN | 110717764 A | 1/2020 |
| CN | 111209346 A | 5/2020 |
| JP | 2019-160312 A | 9/2019 |
| JP | 2019-532401 A | 11/2019 |
| WO | WO 2019/174430 A1 | 9/2019 |

OTHER PUBLICATIONS

International Search Report with English translation and Written Opinion regarding PCT/CN2021/080371 dated Jun. 23, 2021, 10 pages.

Chinese Office Action with English concise explanation regarding 202010329695.3 dated Jun. 9, 2020, 7 pages.

Zhao et al., "Research and Application of Block File Storage Model Based on Blockchain System of Erasure Code," Netinflo Security, Chongqing, China, Feb. 28, 2019, 8 pages.

\* cited by examiner

BLOCKCHAIN DATA ARCHIVING METHOD, APPARATUS, AND COMPUTER-READABLE STORAGE MEDIUM

RELATED APPLICATION

This application is a continuation application of PCT Patent Application No. PCT/CN2021/080371, filed on Mar. 12, 2021, which is based on and claims priority to Chinese Patent Application No. 202010329695.3 filed on Apr. 24, 2020, both of which are incorporated herein by reference in their entireties.

FIELD OF THE TECHNOLOGY

This application relates to the field of communication technologies, and in particular, to a blockchain data archiving method, apparatus, electronic device, and computer-readable storage medium.

BACKGROUND OF THE DISCLOSURE

A blockchain system refers to a collection of a series of nodes that add new blocks into a blockchain through consensus. In recent years, with the development of blockchain technology, blockchain systems are more widely used in the field of transactions, for example, can be used in transaction scenarios such as banks and governments. As the running time of the blockchain system increases, the storage space occupied by the blockchain data of each node in the blockchain system will also increase, resulting in slow response or even breakdown of the nodes in the blockchain system, affecting the operation of the blockchain.

The present disclosure describes embodiments of blockchain data archiving methods, apparatus, electronic devices, and computer-readable storage medium, addressing at least one of the problems/issues described above, effectively increasing the precision and efficiency of archiving blockchain data, leaving to improvement in the technology field of blockchain implementations and/or applications.

SUMMARY

Embodiments of this application provide a blockchain data archiving method, applicable to a blockchain system, the blockchain system including a consensus node, a first committing node, and a second committing node.

The present disclosure describes a method for archiving blockchain data. The method includes synchronizing, by a first committing node, blockchain data with a consensus node, and determining a synchronization block height of the synchronized blockchain data, the synchronized blockchain data comprising state data. The first committing node includes a memory storing instructions and a processor in communication with the memory. The method also includes determining, by the first committing node, target state data required by a current transaction in the state data, and backing up the target state data; generating, by the first committing node, a state data snapshot of the synchronization block height according to the backed-up target state data, and transmitting the state data snapshot, the synchronization block height, and signature information of the first committing node to a second committing node as archiving point information; receiving, by the first committing node, endorsement information of the second committing node for the archiving point information; and archiving, by the first committing node, the synchronized blockchain data according to the endorsement information and the archiving point information.

The present disclosure describes an apparatus for archiving blockchain data. The apparatus includes a memory storing instructions; and a processor in communication with the memory. When the processor executes the instructions, the processor is configured to cause the apparatus to perform: synchronizing blockchain data with a consensus node, and determining a synchronization block height of the synchronized blockchain data, the synchronized blockchain data comprising state data, determining target state data required by a current transaction in the state data, and backing up the target state data, generating a state data snapshot of the synchronization block height according to the backed-up target state data, and transmitting the state data snapshot, the synchronization block height, and signature information of the apparatus to a second committing node as archiving point information, receiving endorsement information of the second committing node for the archiving point information, and archiving the synchronized blockchain data according to the endorsement information and the archiving point information.

The present disclosure describes a non-transitory computer-readable storage medium, storing computer-readable instructions. The computer-readable instructions, when executed by a processor, are configured to cause the processor to perform: synchronizing blockchain data with a consensus node, and determining a synchronization block height of the synchronized blockchain data, the synchronized blockchain data comprising state data; determining target state data required by a current transaction in the state data, and backing up the target state data; generating a state data snapshot of the synchronization block height according to the backed-up target state data, and transmitting the state data snapshot, the synchronization block height, and signature information of a first committing node to a second committing node as archiving point information; receiving endorsement information of the second committing node for the archiving point information; and archiving the synchronized blockchain data according to the endorsement information and the archiving point information.

Another aspect of the embodiments of this application provides a method including:

synchronizing, by the first committing node, blockchain data with the consensus node, and determining a synchronization block height of the synchronized blockchain data, the synchronized blockchain data including state data;

determining, by the first committing node, target state data required by a current transaction in the state data, and backing up the target state data;

generating, by the first committing node, a state data snapshot of the synchronization block height according to the backed-up target state data, and transmitting the state data snapshot, the synchronization block height, and signature information of the first committing node to the second committing node as archiving point information;

receiving, by the first committing node, endorsement information of the second committing node for the archiving point information; and archiving, by the first committing node, the synchronized blockchain data according to the endorsement information and the archiving point information.

Correspondingly, the embodiments of this application provide a blockchain data archiving apparatus, applicable to a blockchain system, the blockchain system including a consensus node, a first committing node, and a second committing node, the apparatus including:

a synchronization unit, configured to synchronize, by the first committing node, blockchain data with the consensus node, and determine a synchronization block height of the synchronized blockchain data, the synchronized blockchain data including state data;

a determining unit, configured to determine, by the first committing node, target state data required by a current transaction in the state data, and back up the target state data;

a generation unit, configured to generate, by the first committing node, a state data snapshot of the synchronization block height according to the backed-up target state data, and transmit the state data snapshot, the synchronization block height, and signature information of the first committing node to the second committing node as archiving point information;

a receiving unit, configured to receive, by the first committing node, endorsement information of the second committing node for the archiving point information; and an archiving unit, configured to archive, by the first committing node, the synchronized blockchain data according to the endorsement information and the archiving point information.

In addition, the embodiments of this application further provide an electronic device, including a memory and a processor, the memory storing executable instructions, and the processor being configured to execute the executable instructions stored in the memory to implement the blockchain data archiving method according to the embodiments of this application.

In addition, the embodiments of this application further provide a computer-readable storage medium, storing executable instructions, the executable instructions, when executed by a processor, implementing the blockchain data archiving method according to the embodiments of this application.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application. A person skilled in the art may still derive other drawings from these accompanying drawings without creative efforts.

DESCRIPTION OF EMBODIMENTS

Figure 1A:
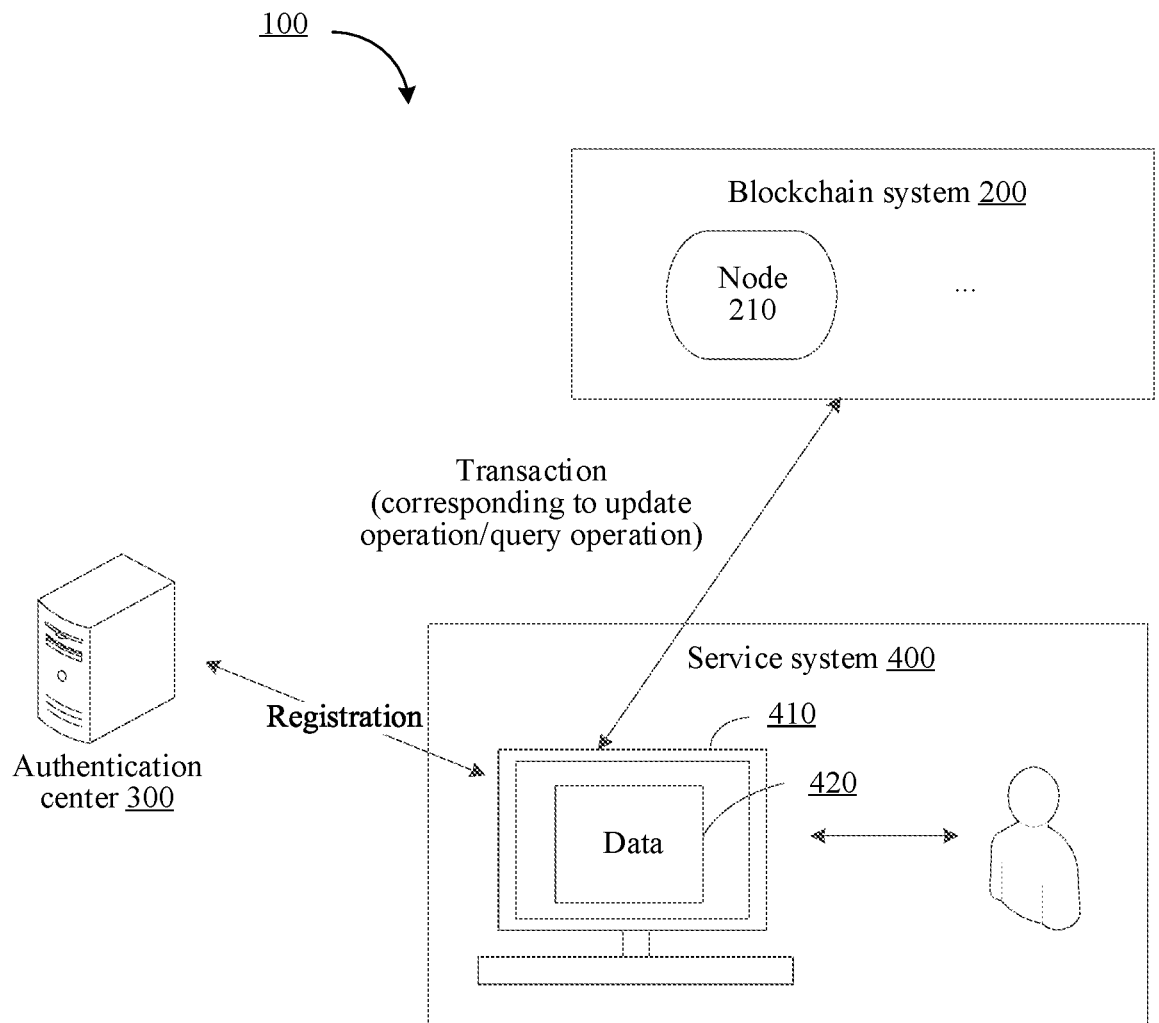
FIG. 1A is a schematic structural diagram of a blockchain data archiving system according to an embodiment of this application.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein. In the following description, the term "plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Blockchain: An encrypted chain transaction storage structure formed by blocks. For example, a header of each block may not only include hash values of all transactions in the block, but also include hash values of all transactions in a previous block, to implement anti-tampering and anti-counterfeiting of a transaction in a block based on hash values. A newly generated transaction is filled into a block and after a consensus process of nodes in a blockchain system, the block is added to an end of the blockchain to form a chain growth.

2) Blockchain network: Also referred to as blockchain system, which is a collection of a series of nodes that add new blocks into a blockchain through consensus.

(3) Transaction: It is a term in the computer field, which, for example, may refer to "event" and/or "action". The transaction includes an operation that needs to be submitted to a blockchain system for execution, rather than simply refers to transaction in a business context. Considering that the term "transaction" is conventionally used in blockchain technology, the embodiments of this application follow this convention.

For example, a deploy transaction is configured to install a specified smart contract on a node in the blockchain system for invocation; an invoke transaction is configured to add a transaction record to a blockchain by invoking a smart contract, and perform an operation on a state database of the blockchain, including an update operation (including adding, deleting, or modifying a key-value pair in the state database) and a query operation (that is, querying for a key-value pair in the state database).

4) Ledger: It is a collective term for a blockchain (also referred to as ledger data) and a state database synchronized with the blockchain. The blockchain records transactions in the form of files in a file system. The state database records the transactions in the blockchain in the form of key-value pairs, and is configured to support quick query of the transactions in the blockchain. The state database is also referred to as ledger database.

(5) Smart contract: Also referred to as chaincode or application code, which is a program deployed in a node of a blockchain network. The node executes a smart contract invoked in a received transaction, to perform an update or query operation on key-value pair data in the state database.

(6) Consensus: It is a process in the blockchain network, and is used for a plurality of nodes involved to reach an agreement on a transaction in a block, so that the agreed block is added to an end of a blockchain. Consensus mechanisms include proof of work (PoW), proof of stake (PoS), delegated proof-of-stake (DPoS), proof of elapsed time (PoET), and the like.

As the running time of the blockchain system increases, the storage space occupied by the blockchain data of each node in the blockchain system will also increase, affecting the operation of the blockchain. In solutions provided by related technologies, generally a ledger snapshot of a node is generated, then the ledger snapshot is stored in a dedicated distributed storage system, and finally, local block data such as blocks, transaction information, and receipts before the snapshot point are deleted from the node, to reduce the occupation of the local storage space of the node.

In the process of research and practice of related technologies, it is found that: when the ledger snapshot is generated, the blockchain system is still providing transaction services normally, and if a transaction is being carried out during snapshot reading/writing of state data of the ledger, the snapshot reading/writing conflicts with the transaction, resulting in failure in snapshot reading or inaccurate data obtained by snapshot reading and the lack of credibility of the generated state data snapshot. Therefore, in the solutions provided by related technologies, the precision and efficiency of archiving blockchain data are low.

The embodiments of this application provide a blockchain data archiving method, apparatus, electronic device, and computer-readable storage medium, which can effectively improve the precision and efficiency of archiving blockchain data. The blockchain data archiving apparatus may be integrated in an electronic device. The electronic device may be a server, a terminal, or the like.

The blockchain data archiving method provided in the embodiments of this application is mainly applicable to a blockchain system. The blockchain is a novel application mode of computer technologies such as distributed data storage, point-to-point transmission, consensus mechanisms, and encryption algorithms. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

The underlying blockchain platform may include user management, basic service, smart contract, operation monitoring, and other processing modules. The user management module is responsible for identity information management of all blockchain participants, including maintenance of public and private key generation (account management), key management, and maintenance of a correspondence between a real identity of a user and a blockchain address (authority management), and when authorized, supervising and auditing transactions of some real identities and providing rule configuration for risk control (risk control audit). The basic service module is deployed on all blockchain node devices to verify the validity of service requests, and record valid requests in a storage after consensus. For a new service request, the basic service module first performs interface adaption analysis and authentication processing (interface adaption), and then encrypts service information by using a consensus algorithm (consensus management), and after the encryption, the information is completely and consistently transmitted to a shared ledger (network communication), and is recorded and stored. The smart contract module is responsible for contract registration and issuance, contract triggering, and contract execution. Developers may define contract logic through a specific programming language and publish the logic on the blockchain (contract registration). According to the logic of contract terms, the smart contract module completes the contract logic by invoking a key or when triggered by another event, which also provides functions of contract upgrade and cancellation. The operation monitoring module is mainly responsible for deployment during the product release process, configuration modification, contract settings, cloud adaptation, and visual outputting of a real-time status during product operation, for example, warning, monitoring network conditions, and monitoring a health status of a node device.

The platform product service layer provides basic capabilities and implementation frameworks for typical applications. Based on the basic capabilities, the developers may superimpose service characteristics to complete a blockchain implementation of the service logic. The application service layer provides application services based on a blockchain solution for service participants to use.

An exemplary application of the blockchain system provided by the embodiments of this application is described below. Referring to FIG. 1A, FIG. 1A is a schematic structural diagram of a blockchain data archiving system 100 according to an embodiment of this application, including a blockchain system 200 (where the blockchain system 200 includes a plurality of nodes, and a node 210 is exemplarily shown in FIG. 1A) and a service system 400 (where a terminal 410 belonging to the service system 400 and a graphical interface 420 thereof are exemplarily shown), which will be described separately below.

The blockchain system 200 may be of various types, for example, may be any one of a public chain, a private chain, or a consortium chain. Using the public chain as an example, an electronic device such as a terminal and a server of any service system (or service entity) may access the blockchain system 200 without authorization. Using the consortium chain as an example, an electronic device (such as a terminal/server) managed by a service system may access the blockchain system 200 after the service entity is authorized. In this case, the electronic device becomes a special node in the blockchain system 200, that is, a client node.

The blockchain system 200 receives a transaction submitted by a client node of a service system (where the terminal 410 is used as an example of the client node for the convenience of description), executes the transaction to update or query a ledger, and displays various intermediate results or final results of the execution of the transaction on the graphical interface 420 of the terminal 410. It may be understood that, in the blockchain system 200, the transactions may be received and executed by the native node 210 in the blockchain system 200. Certainly, when a client node of a service system has the functions (such as a consensus function and a ledger function) of the native node 210 in the blockchain system 200, the transactions may be received and executed by the corresponding client node.

The following describes an exemplary application of the blockchain system by taking access of the service system to the blockchain system as an example.

Referring to FIG. 1A, when needing to upload data to the blockchain, the terminal 410 may generate a transaction corresponding to an update operation, where the transaction includes the data to be uploaded. In addition, a smart contract that needs to be invoked to implement the update operation and parameters to be passed to the smart contract may also be specified in the transaction. The transaction may also carry a digital signature signed by the service system 400 (for example, which is obtained by using a private key in a digital certificate by an authentication center 300 for the service system 400 to encrypt a digest of the transaction). The transaction is broadcast to the blockchain system 200.

When receiving the transaction, a node 210 in the blockchain system 200 verifies the digital signature carried in the transaction. When the verification of the digital signature in the transaction is successful, the node 210 determines whether the service system 400 has transaction permission according to an identity of the service system 400 carried in the transaction. The transaction fails if either of the digital signature verification or the permission verification fails. After the verification succeeds, the node 210 signs its own digital signature (which is, for example, obtained by encrypting the digest of the transaction by using a private key of the node 210), and further broadcasts the transaction in the blockchain system 200. The digital signature is signature information.

After receiving the successfully verified transaction, a node 210 with a sorting function in the blockchain system 200 adds the transaction to a new block and broadcasts the new block to nodes that provide a consensus service in the blockchain network 200 (i.e., consensus nodes).

The nodes 210 that provide the consensus service in the blockchain system 200 perform a consensus check on the new block and reach a consensus. A node 210 that provides a ledger function adds the new block to the end of the blockchain and executes the transaction in the new block. For the transaction that submits data, a key-value pair corresponding to the data is added to the state database to update the state database. One node in the blockchain system can provide multiple functions at the same time, such as providing the sorting function and the consensus function at the same time.

Similarly, when needing to query data from the blockchain system 200, the terminal 410 may generate a transaction corresponding to the query operation (for example, the transaction may include a key to be queried), where a smart contract that needs to be invoked to implement the query operation and parameters to be passed to the smart contract are specified in the transaction, and the transaction may also carry a digital signature signed by the service system 400; and broadcast the transaction to the blockchain system 200.

After the nodes 210 in the blockchain system 200 successfully verify the transaction, add the transaction to a new block, and reach a consensus on the new block, the new block is added to the end of the blockchain, and the transaction in the new block is executed. For the transaction of querying data, a corresponding key-value pair is queried from the state database, and a query result is returned (for example, the query result may be a value corresponding to the key in the submitted transaction).

In the embodiments of this application, the blockchain system may include a consensus node and a plurality of committing nodes. The committing node may be responsible for read and write operations of the ledger by executing the chaincode, that is, mainly responsible for maintaining a copy of the state data and the ledger. The committing node can also be referred to as a peer node. The consensus node can also be referred to as a consensus orderer, and in the blockchain system, is mainly configured to receive transactions containing signature information, sort unpackaged transactions to generate blocks, and broadcast the blocks to the peer nodes. The quantity of consensus nodes included in the blockchain system may only one. Alternatively, the blockchain system may also include a node cluster of consensus nodes. In the embodiments of this application, for the convenience of description, a committing node that needs to perform an archiving operation is referred to as a first committing node, and the other committing nodes are referred to as second committing nodes. The quantity of the second committing nodes is at least one.

Figure 1B:
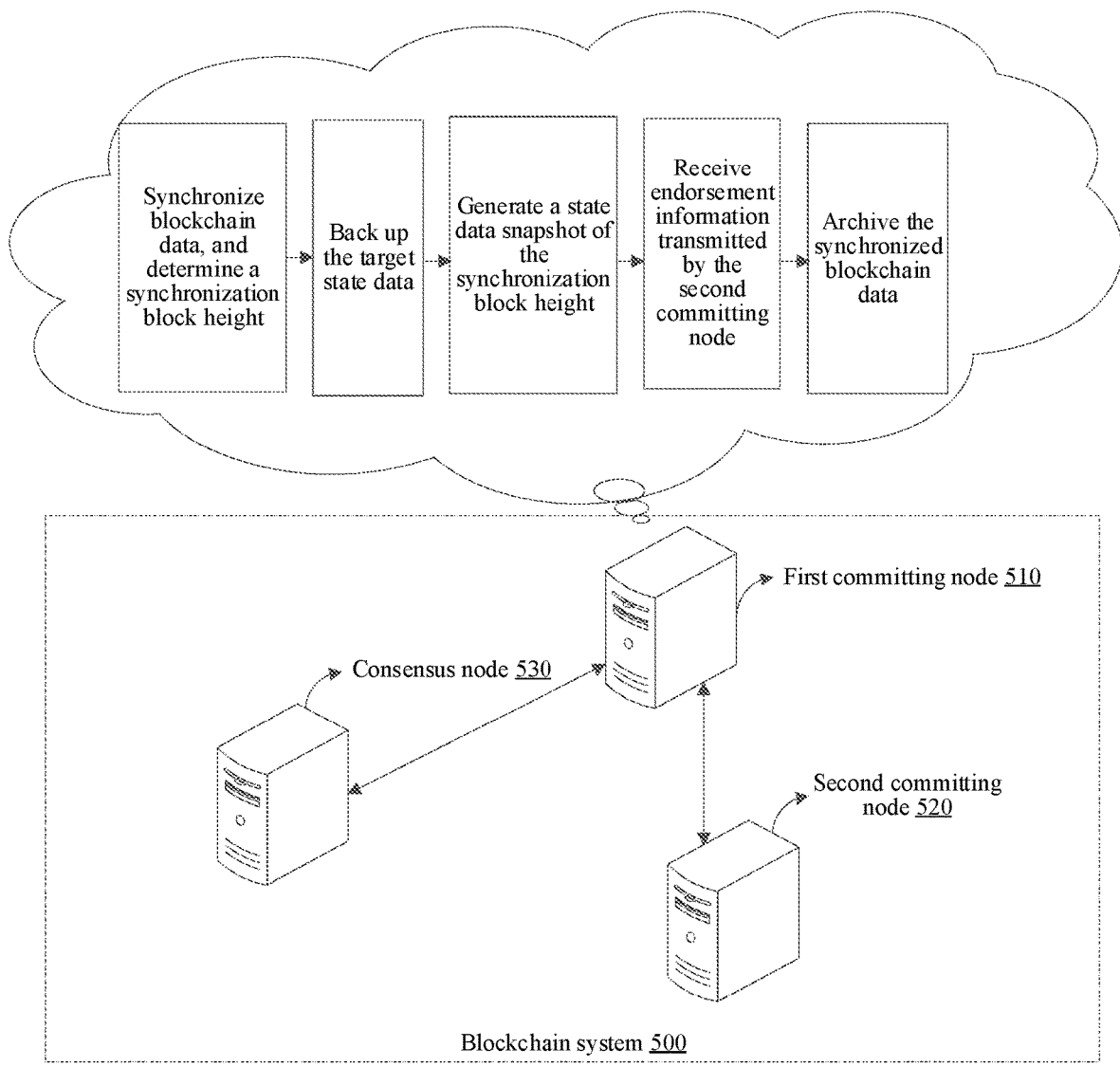
FIG. 1B is a schematic structural diagram of a blockchain system according to an embodiment of this application.

For example, referring to the schematic structural diagram of the blockchain system shown in FIG. 1B, a blockchain system 500 includes a first committing node 510, a second committing node 520, and a consensus node 530. The first committing node 510 may synchronize blockchain data with the consensus node 530, and determines a synchronization block height of the synchronized blockchain data, the synchronized blockchain data including state data. Then, the first committing node 510 determines target state data required by a current transaction in the state data, and backs up the target state data, the current transaction being a transaction performed after the blockchain data is synchronized. The first committing node 510 generates a state data snapshot of the synchronization block height according to the backed-up target state data, and transmits the state data snapshot, the synchronization block height, and signature information of the first committing node 510 to the second committing node 520 as archiving point information. The first committing node 510 receives endorsement information of the second committing node 520 for the archiving point information, the endorsement information being used for indicating approval of the archiving point information by the second committing node 520. Finally, the first committing node 510 archives the synchronized blockchain data according to the endorsement information and the archiving point information.

The blockchain data may include block data in the blockchain and state data describing a world state. The block data is a record of every transaction that actually occurs on the blockchain. The block data may include ordinary block data and configuration block data. The state data may include a current state recording each account and smart contract. The state data of a node may be stored in a state database of the node (i.e., a local database).

Archiving may be understood as data archiving, which mainly refers to copying some data in blockchain data to obtain snapshots, and may also refer to deleting and/or transferring block data within a certain range to a cold storage of another distributed storage system (which is a distributed storage system different from the blockchain system, and is specially used for archiving), to save the local storage space of the committing node.

In the embodiments of this application, nodes (such as committing nodes, consensus nodes, etc.) in the blockchain system may be servers or terminals, and the same is true for client nodes. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected through wired or wireless communication, which is not limited in the embodiments of this application.

The blockchain data archiving method provided in the embodiments of the application will be described below with reference to an exemplary application and implementation of the blockchain system provided in the embodiments of the application. The description sequence of the following embodiments is not intended to limit preference orders of the embodiments.

The embodiments of this application will be described from the perspective of a blockchain data archiving apparatus. The blockchain data archiving apparatus may be integrated in an electronic device. The electronic device may be a server, a terminal, or the like.

Figure 2A:
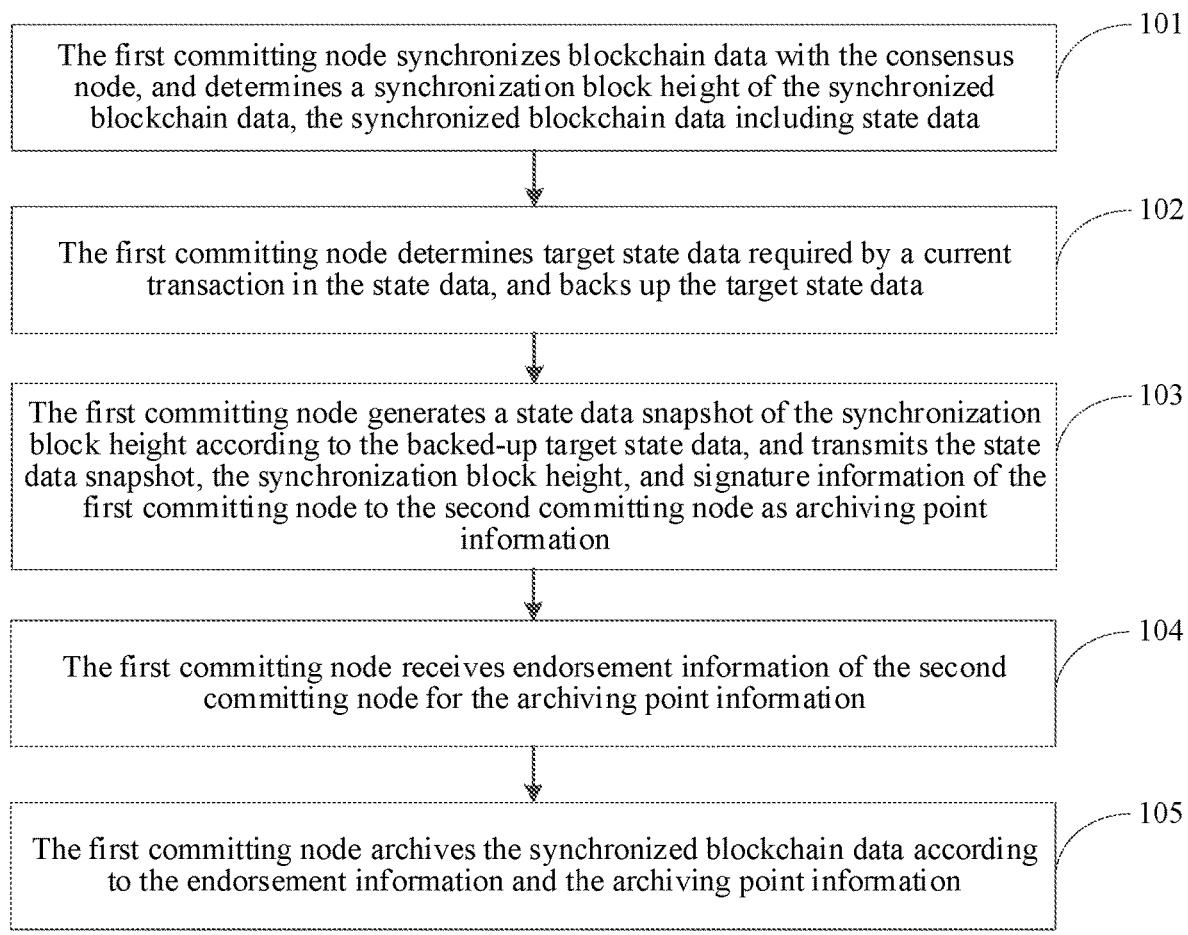
FIG. 2A is a schematic flowchart of a blockchain data archiving method according to an embodiment of this application.

Referring to FIG. 2A, FIG. 2A is a schematic flowchart of a blockchain data archiving method according to an embodiment of this application. The method will be described with reference to steps shown in FIG. 2A.

In step 101, the first committing node synchronizes blockchain data with the consensus node, and determines a synchronization block height of the synchronized blockchain data, the synchronized blockchain data including state data.

In the embodiments of this application, the blockchain system includes a consensus node and a plurality of committing nodes. The committing node can also be referred to as a peer node, and is responsible for read and write operations of the ledger by executing the chaincode, that is, mainly responsible for maintaining a copy of the state data and the ledger. The consensus node is configured to receive transactions containing signature information, sort unpackaged transactions to generate blocks, and broadcast the blocks to the peer nodes. In the embodiments of this application, for the convenience of description, a committing node that needs to perform data archiving is referred to as a first committing node, and the other committing nodes are referred to as second committing nodes. The quantity of the second committing nodes is at least one.

When needing to perform data archiving, the first committing node synchronizes blockchain data with the consensus node, and determines a synchronization block height of the synchronized blockchain data. The synchronized blockchain data includes block data and state data. The block data is used for describing blocks in the blockchain. The state data may include a current state recording each account and smart contract in the blockchain system.

The synchronization block height may refer to a block height (or a quantity of blocks) of the synchronized blockchain data obtained after the first committing node synchronizes the blockchain data with the consensus node. For example, if there are 5 blocks in the synchronized blockchain data of the first committing node, the synchronization block height may be 5.

In some embodiments, the first committing node synchronizes the blockchain data with the consensus node in the following manner: transmitting, by the first committing node, a synchronization request to the consensus node, the synchronization request including an identity of the first committing node; receiving, by the first committing node, a block transmitted by the consensus node for the synchronization request, the block being transmitted by the consensus node after successfully verifying the identity of the first committing node in the synchronization request; and updating, by the first committing node, local blockchain data according to the block transmitted by the consensus node, to obtain the synchronized blockchain data.

In some other implementations, the first committing node may synchronize the blockchain data with the consensus node in another manner: transmitting, by the first committing node, a synchronization request to the consensus node, the synchronization request including an identity of the first committing node; verifying, by the consensus node, the identity of the first committing node in the synchronization request; in response to successfully verifying the identity of the first committing node in the synchronization request, transmitted, by the consensus node to the first committing node, one or more blocks for the synchronization request; receiving, by the first committing node, the one or more blocks for the synchronization request; and updating, by the first committing node, local blockchain data according to the one or more blocks transmitted by the consensus node, to obtain the synchronized blockchain data.

For example, the first committing node may transmit a synchronization request to the consensus node, where the synchronization request may carry the identity of the first committing node. When receiving the synchronization request, the consensus node verifies the identity of the first committing node in the synchronization request. When the verification of the identity of the first committing node by the consensus node is passed, that is, when it is determined that the identity of the first committing node is authentic, a block locally stored on the consensus node is transmitted to the first committing node. The consensus node may transmit all blocks stored locally to the first committing node, or may transmit a latest block to the first committing node to save computing resources. The latest block may refer to blocks newly added to the end of the blockchain (where the quantity of the newly added blocks is equal to a synchronization quantity threshold which is, for example, 1 or 2), or may refer to block newly added since last synchronization (that is, last time the consensus node transmits a block(s) to the first committing node). For ease of understanding, the following description is given using an example where the consensus node transmits the latest block to the first committing node.

After receiving the latest block from the consensus node, the first committing node updates the local blockchain data according to the latest block received, and uses the updated blockchain data as the synchronized blockchain data, thus completing the blockchain data synchronization. The first committing node identifies a quantity of blocks existing in the synchronized blockchain data, and uses the quantity of blocks as the synchronization block height of the synchronized blockchain data. For example, if the synchronized blockchain data contains 5 blocks, the synchronization block height of the synchronized blockchain data is 5.

The first committing node may trigger a synchronization request (i.e., transmit a synchronization request to the consensus node) when receiving an archiving request or archiving instruction (for example, a manually triggered archiving request or archiving instruction). Alternatively, the first committing node may automatically trigger the transmission of the synchronization request at regular intervals. For example, the first committing node may be set to trigger a synchronization request every 5 minutes or every 20 minutes, and then determine the synchronization block height of the synchronized blockchain data.

In step 102, the first committing node determines target state data required by a current transaction in the state data, and backing up the target state data.

After the blockchain data is synchronized, the nodes in the blockchain system may still be conducting transactions. If these transactions are ignored, the accuracy of data archiving will be reduced. Therefore, in the embodiments of this application, the first committing node determines the target state data required by the current transaction in the state data included in the synchronized blockchain data, and backs up the target state data, where the current transaction being a transaction performed after the blockchain data is synchronized.

If there is no current transaction or the target state data required by the current transaction does not exist in the state data, the first committing node may directly archive the synchronized blockchain data, in which case the accuracy of data archiving can be ensured.

In some embodiments, the first committing node may determine the target state data required by the current transaction in the state data in the following manner: matching, by the first committing node, the synchronization block height against an archiving block height; and determining, by the first committing node, the target state data required by the current transaction in the state data, in a case that the synchronization block height matches the archiving block height.

To avoid the waste of computing resources caused by too many times data archiving that is meaningless or less useful, conditions may be set in advance for data archiving. For example, an archiving block height may be preset, and the first committing node matches the synchronization block height against the archiving block height after obtaining the synchronization block height. The first committing node executes the operation of determining the target state data required by the current transaction in the state data, in a case that the synchronization block height matches the archiving block height. The first committing node does not perform any subsequent operation, in a case that the synchronization block height does not match the archiving block height.

The archiving block height may be set according to actual application scenarios, and the quantity of archiving block heights may be one or more. For example, a plurality of archiving block heights at equal intervals may be set, which are, for example, integer multiples of 10, specifically including 10, 20, . . . , 10*n, where N is an integer greater than 1. In a case that the quantity of archiving block heights is only one, "the synchronization block height matches the archiving block height" may mean that the synchronization block height is the same as the archiving block height, and "the synchronization block height does not match the archiving block height" may mean that the synchronization block height is different from the archiving block height. In a case that the quantity of archiving block heights is more than one, "the synchronization block height matches the archiving block height" may mean that the synchronization block height is the same as one of the archiving block heights, and "the synchronization block height does not match the archiving block height" may mean that the synchronization block height is different from all the archiving block heights. By the above method, the necessity of data archiving can be ensured, thereby saving computing resources and avoiding meaningless or less useful data archiving.

In step 103, the first committing node generates a state data snapshot of the synchronization block height according to the backed-up target state data, and transmits the state data snapshot, the synchronization block height, and signature information of the first committing node to the second committing node as archiving point information.

The state data snapshot may be a snapshot obtained by snapshot copying the state data (which is the target state data after backup).

The first committing node may package the state data snapshot, the synchronization block height, and the signature information of the first committing node into the archiving point information, and transmit the archiving point information to the second committing node. The first committing node may sign the state data snapshot to obtain the signature information.

In step 104, the first committing node receives the endorsement information of the second committing node for the archiving point information. In some implementations, step 104 may include the first committing node receives, from the second committing node, the endorsement information for the archiving point information.

The endorsement information is used for indicating approval of the archiving point information by the second committing node. The second committing node may verify the received archiving point information, and when the verification is passed, sign the archiving point information to obtain the endorsement information.

For example, the second committing node may verify a root hash value of the state data snapshot in the archiving point information transmitted by the first committing node. When the root hash value of the state data snapshot of the first committing node is the same as a root hash value of a state data snapshot of the second committing node itself (that is, the verification is passed), the second committing node approves the archiving point information, and signs the archiving point information to obtain the endorsement information for the archiving point information. At the same time, the second committing node may also broadcast the archiving point information to other second committing nodes.

In some embodiments, between any steps, the method further includes: extracting, by the first committing node, a root hash value of state data of the second committing node from the archiving point information, in a case that the first committing node receives the archiving point information transmitted by the second committing node; comparing, by the first committing node, the root hash value of the state data of the second committing node with a root hash value of state data of the first committing node; signing, by the first committing node, the archiving point information to obtain endorsement information for the archiving point information, in a case that the root hash value of the state data of the second committing node is the same as the root hash value of the state data of the first committing node; and transmitting, by the first committing node, the endorsement information to the second committing node, and broadcasting the archiving point information in the blockchain system.

The first committing node may also receive archiving point information transmitted by a second committing node that requires data archiving. In this case, the first committing node extracts a root hash value of state data of the second committing node from the archiving point information transmitted by the second committing node, and compares the extracted root hash value with the root hash value of the state data of the first committing node. The method of generating the root hash value will be described later. When the root hash value of the state data of the second committing node is the same as the root hash value of the state data of the first committing node, the first committing node signs the archiving point information transmitted by the second committing node to obtain endorsement information for the archiving point information, and transmits the endorsement information to the second committing node. At the same time, the first committing node may also broadcast the archiving point information transmitted by the second committing node in the blockchain system. By the above method, the accuracy and validity of endorsements are improved.

In step 105, the first committing node archives the synchronized blockchain data according to the endorsement information and the archiving point information.

For example, the first committing node may determine target block data to be deleted from the synchronized blockchain data according to the endorsement information and the archiving point information, delete the target block data, and store the target block data to a distributed storage system specially used for archiving. The distributed storage system is different from the blockchain system.

As shown in FIG. 2A, in the embodiments of this application, by backing up the target state data required by the current transaction and generating a state data snapshot based on the backed-up target state data, the conflict between the snapshot and the original transaction is solved, and a real-time snapshot of the state data is achieved. In addition, the other committing nodes in the blockchain system sign and endorse information such as the state data snapshot, which makes the information credible. Therefore, the efficiency and accuracy of blockchain data archiving can be greatly improved.

Figure 2B:
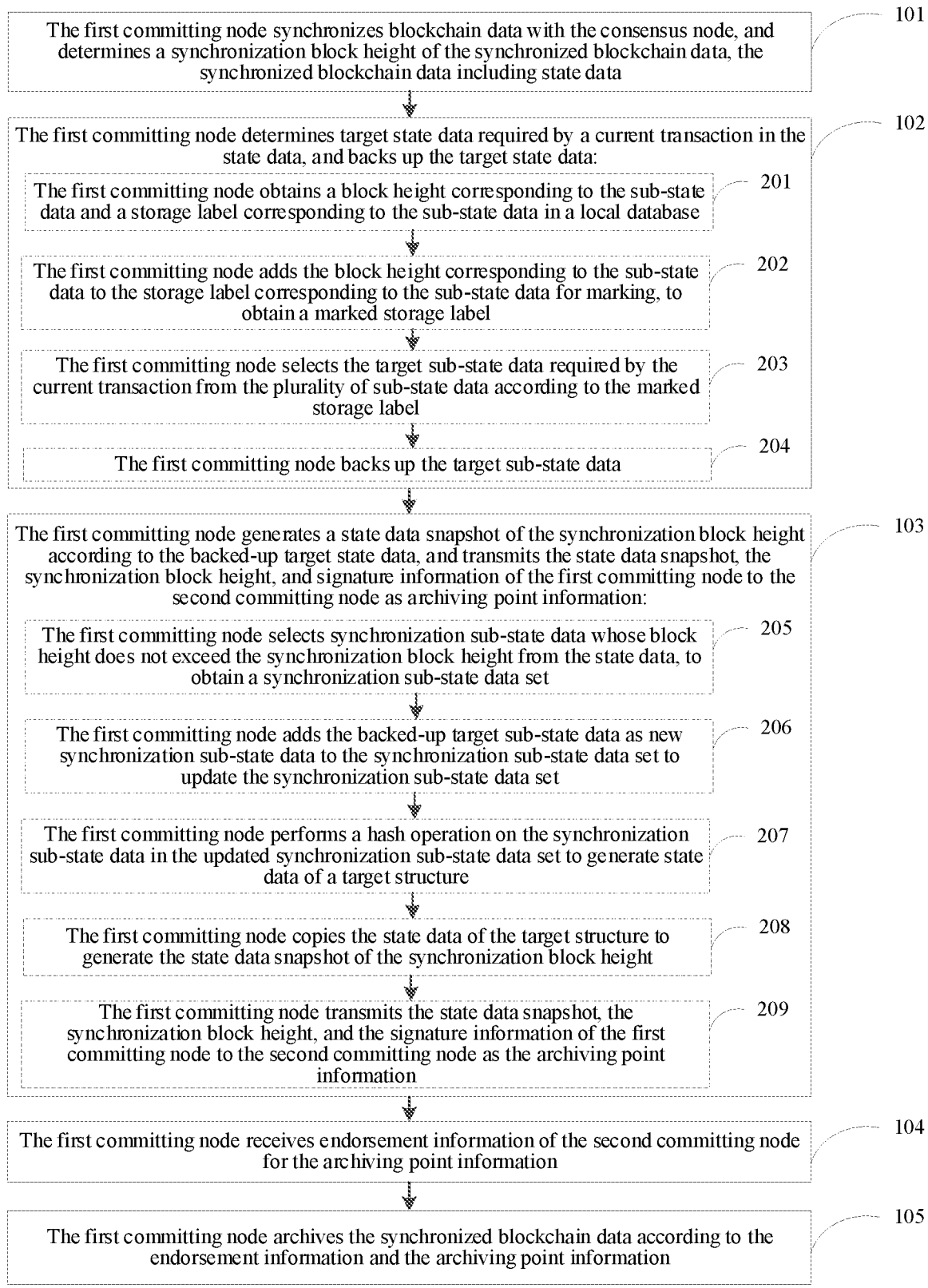
FIG. 2B is a schematic flowchart of a blockchain data archiving method according to an embodiment of this application.

In some embodiments, Referring to FIG. 2B, FIG. 2B is a schematic flowchart of a blockchain data archiving method according to an embodiment of this application. Step 102 shown in FIG. 2A may be implemented through steps 201 to 204, which will be described in conjunction with the steps.

In step 201, the first committing node obtains a block height corresponding to the sub-state data and a storage label corresponding to the sub-state data in a local database.

The state data may include a plurality of sub-state data stored in the local database (i.e., state database) of the first committing node.

The storage label may refer to a key-value (K-V) pair in the local database, each key (K) being corresponding to one value (V). For example, the storage label of a certain sub-state data in the local database may be K1-V1, where K1 is a serial number of the sub-state data in the local database, and V1 is a value corresponding to the serial number in the local database.

Different sub-state data may correspond to different block heights, and the first committing node may determine the block height corresponding to the sub-state data according to a block serial number corresponding to the sub-state data. For example, if first sub-state data corresponds to a block 1 (which is the first block in the blockchain), it indicates that the block height corresponding to the first sub-state data is 1; and if second sub-state data corresponds to a block 3 (which is the third block in the blockchain), it indicates that the block height corresponding to the second sub-state data is 3. The first committing node may read a key-value pair corresponding to each sub-state data from the local database, and use the key-value pair as the storage label of the sub-state data.

In step 202, the first committing node adds the block height corresponding to the sub-state data to the storage label corresponding to the sub-state data for marking, to obtain a marked storage label.

For example, the first committing node adds the block height corresponding to the sub-state data to the storage label corresponding to the sub-state data to mark the storage label. For example, the first committing node may add a version to the storage label of the sub-state data, where the version is the block height corresponding to the sub-state data. For example, a certain sub-state data corresponds to a block height of 5 and a storage label of (K1-V1), and after the version (block height) is added to the storage label for marking, the marked storage label may be (K1-V1, version (5)).

In step 203, the first committing node selects the target sub-state data required by the current transaction from the plurality of sub-state data according to the marked storage label.

In some embodiments, the first committing node may select the target sub-state data required by the current transaction from the plurality of sub-state data according to the marked storage label in the following manner: obtaining, by the first committing node, transaction information corresponding to the current transaction; determining, by the first committing node, a current block height of current blockchain data of the first committing node according to the transaction information; determining, by the first committing node, that a new block exists in the current blockchain data, in a case that the current block height exceeds the synchronization block height; selecting, by the first committing node, invocation information required by a transaction in the new block from the current blockchain data, the invocation information being used for indicating the sub-state data to be invoked; and selecting, by the first committing node, the target sub-state data from the plurality of sub-state data according to the invocation information and the marked storage label.

For example, after the blockchain data synchronization, if there is still transaction information in the current transaction, it means that the committing nodes in the blockchain system are still conducting transactions at the moment, the first committing node receives a new block transmitted from the consensus node. In this case, the first committing node may determine the current block height according to the current blockchain data. The current blockchain data is not necessarily the synchronized blockchain data. The current blockchain data is blockchain data obtained by updating the synchronized blockchain data with transactions after the blockchain data synchronization. Therefore, the block height of the current blockchain data may be different from that of the synchronized blockchain data. If there is no transaction information in the current transaction (equivalent to that there is no current transaction), it means that the current blockchain data at the moment is equal to the synchronized blockchain data.

When the current block height exceeds the synchronization block height, the first committing node determines that there is a new block in the current blockchain data, and selects invocation information required by a transaction in the new block from the current blockchain data, the invocation information being used for indicating the sub-state data to be invoked. For example, the invocation information may be used for indicating which sub-state data at which block height in the state data needs to be invoked for the current transaction, for example, sub-state data with a block height of 3 and a sub-state data value of V1 needs to be invoked. The first committing node determines a marked storage label of sub-state data to be invoked according to the invocation information, and selects the target sub-state data from the state data according to the determined marked storage label. For example, when the invocation information is used for indicating that sub-state data with a block height of 3 and a sub-state data value of V1 needs to be invoked, the first committing node may determine that the marked storage label of the target sub-state data to be invoked is (K1-V1, version (3)), and the first committing node may select the target sub-state data from the state data according to the marked storage label. The target state data includes all the target sub-state data selected here. By the above method, the accuracy of selecting the target sub-state data can be improved.

When the current block height does not exceed the synchronization block height, the first committing node may stop execution of subsequent operations, that is, stop data archiving.

In step 204, the first committing node backs up the target sub-state data.

The first committing node may back up the target sub-state data upon selection of the target sub-state data.

In some embodiments, the first committing node may back up the target sub-state data in the following manner: selecting, by the first committing node, transaction operation information required by the transaction in the new block from the transaction information; determining, by the first committing node, a transaction operation type corresponding to the target sub-state data according to the transaction operation information; backing up, by the first committing node in a case that the transaction operation type is an update operation, the target sub-state data corresponding to the update operation; and backing up, by the first committing node in a case that the transaction operation type is a deletion operation, the target sub-state data corresponding to the deletion operation, and adding a deletion label to the backed-up target sub-state data, the deletion label being used for indicating that the backed-up target sub-state data cannot be read during execution of the transaction.

For example, the first committing node may select the transaction operation information required by the transaction in the new block from the transaction information of the current blockchain data, where the transaction operation information includes an operation type of an operation performed on the target sub-state data invoked during the transaction process. Generally, the operation type may include update, delete, etc. The first committing node determines the transaction operation type corresponding to the target sub-state data according to the transaction operation information, for example, maps all the target sub-state data in the transaction operation information to transaction operation types in one-to-one correspondence, and finally obtains the transaction operation type corresponding to each target sub-state data.

Figure 3:
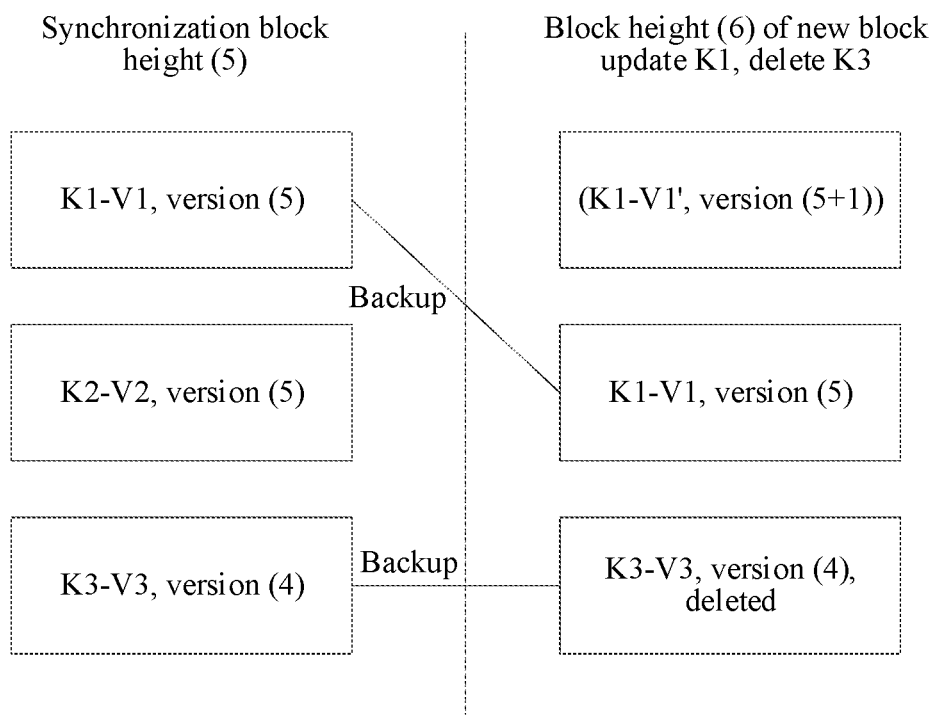
FIG. 3 is a schematic diagram showing backup of sub-state data according to an embodiment of this application.

The first committing node backs up the target sub-state data according to the transaction operation type of the target sub-state data. As shown in FIG. 3, when the transaction operation type of the target sub-state data is an update operation, the target sub-state data corresponding to the update operation is backed up directly. For example, if the marked storage label of the target sub-state data corresponding to the update operation is (K1-V1, version (5)), then the sub-state data may be backed up directly. The block height of the new block in FIG. 3 is the current block height.

When the transaction operation type of the target sub-state data is a delete operation, the first committing node backs up the target sub-state data corresponding to the delete operation, and adds a deletion label to the backed-up target sub-state data. For example, in FIG. 3, the marked storage label of the target sub-state data corresponding to the delete operation is (K3-V3, version (4)), and the first committing node directly backs up the target sub-state data, and adds a deletion label to the backed-up target sub-state data. The deletion label may be any form of identifier, for example, may be "deleted" or "delete" in English, "D", "deleted" or "delete" in Chinese language, or a word in any other foreign language having the meaning of "deleted" or "delete", etc. Adding the deletion label to the backed-up target sub-state data may refer to adding the deletion label to the marked storage label corresponding to the backed-up target sub-state data, so as to update the marked storage label. Taking "deleted" as an example, the marked storage label corresponding to the backed-up target sub-state data may be updated to (K3-V3, version (4), deleted). After the first committing node adds the deletion label to the backed-up target sub-state data, the backed-up target sub-state data cannot be read in subsequent transactions. By the above method, different backup methods are adopted depending on the different transaction operation types corresponding to the target sub-state data, thereby improving the effectiveness and accuracy of backup.

In FIG. 2B, step 103 shown in FIG. 2A may be implemented through steps 205 to 209, which will be described in conjunction with the steps.

In step 205, the first committing node selects synchronization sub-state data whose block height does not exceed the synchronization block height from the state data, to obtain a synchronization sub-state data set.

For example, the first committing node selects the sub-state data whose block height does not exceed the synchronization block height according to the marked storage label of the sub-state data in the state data. For ease of distinguishing, the selected sub-state data is referred to as synchronization sub-state data. For example, when the synchronization block height is 5, the first committing node may select sub-state data of which the block height in the marked storage label does not exceed 5 from the local database, and add the selected sub-state data to the synchronization sub-state data set as synchronization sub-state data.

In step 206, the first committing node adds the backed-up target sub-state data as new synchronization sub-state data to the synchronization sub-state data set to update the synchronization sub-state data set.

Due to the influence by the transaction in the new block (i.e. the current transaction), the target sub-state data corresponding to the update operation in the state data of the first committing node may have been updated, that is, the synchronization sub-state data set obtained in step 205 includes the target sub-state data that has been updated; and the target sub-state data corresponding to the delete operation in the state data of the first committing node may have been deleted, that is, the synchronization sub-state data set obtained in step 205 does not include the target sub-state data corresponding to the delete operation. Therefore, in the embodiments of this application, in order to ensure the data integrity and accuracy of the synchronization sub-state data set, the first committing node adds the backed-up target sub-state data as new synchronization sub-state data to the synchronization sub-state data set, to realize the update of the synchronization sub-state data set.

Because the backed-up target state data may include the backed-up target sub-state data corresponding to the update operation and the backed-up target sub-state data added with the deletion label, the two cases will be described separately.

1) For the target sub-state data corresponding to the update operation, the first committing node uses the backed-up target sub-state data corresponding to the update operation to replace the corresponding synchronization sub-state data in the synchronization sub-state data set. For example, the target sub-state data corresponding to the update operation is (K1-V1, version (5)), and is updated to (K1-V1', version (5+1)) in the transaction of the new block, and the synchronization sub-state data set obtained in step 205 includes (K1-V1', version (5+1)). In this case, the first committing node uses the previously backed up (K1-V1, version (5)) to replace (K1-V1', version (5+1)) in the synchronization sub-state data set, so that the accuracy of the subsequently generated state data snapshot can be ensured.

2) For the target sub-state data corresponding to the delete operation, in an example where the target sub-state data corresponding to the delete operation is (K3-V3, version (4)), because (K3-V3, version (4)) has been deleted during the current transaction, the synchronization sub-state data set obtained in step 205 does not include (K3-V3, version (4)). Therefore, the backed-up target sub-state data added with the deletion label, i.e., (K3-V3, version (4), deleted) is added to the position from which (K3-V3, version (4)) is deleted in the synchronization sub-state data set.

In the above example, the corresponding sub-state data is represented by the marked storage label. By the above method, the updated synchronization sub-state data set can be obtained through replacement and addition operations. In this way, regardless of transactions performed after the blockchain data synchronization, the first committing node can ensure the integrity of the state data within the synchronization block height, thereby further ensuring the accuracy of the state data snapshot of the synchronization block height obtained during snapshot copying of the state data.

In step 207, the first committing node performs a hash operation on the synchronization sub-state data in the updated synchronization sub-state data set to generate state data of a target structure.

For example, the target structure may be, but is not limited to, a Merkle tree.

In some embodiments, the first committing node may perform a hash operation on the synchronization sub-state data in the updated synchronization sub-state data set to generate state data of a target structure in the following manner: classifying, by the first committing node, a plurality of synchronization sub-state data in the updated synchronization sub-state data set to obtain a plurality of types of synchronization sub-state data; performing, by the first committing node, a hash operation on the plurality of types of synchronization sub-state data respectively, to obtain leaf hash values respectively corresponding to the plurality of types of synchronization sub-state data; performing, by the first committing node, a hash operation according to the leaf hash values respectively corresponding to the plurality of types of synchronization sub-state data, to obtain a root hash value; and generating, by the first committing node, the state data of the target structure according to the root hash value and the leaf hash values respectively corresponding to the plurality of types of synchronization sub-state data.

Figure 4:
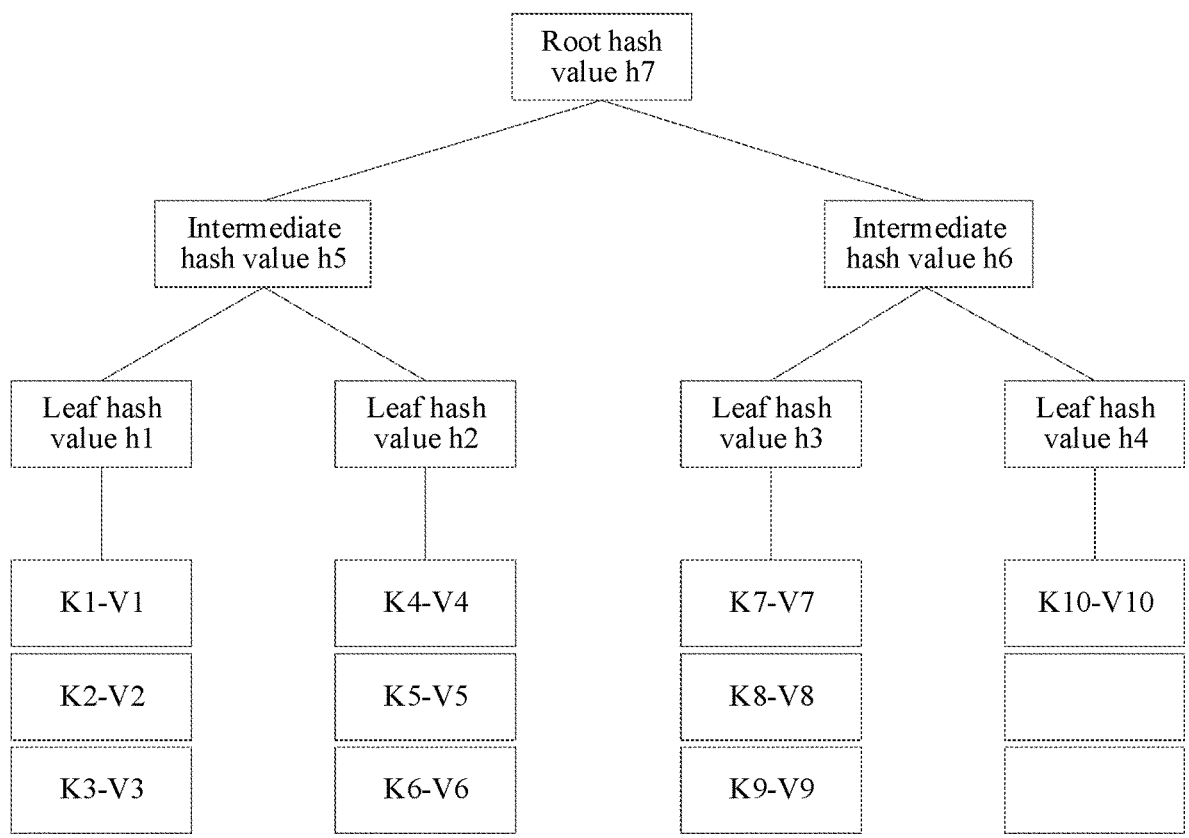
FIG. 4 is a schematic diagram of a snapshot of a Merkle tree corresponding to state data according to an embodiment of this application.

As an example, the embodiments of this application provide a schematic diagram of the state data of the target structure as shown in FIG. 4, where the updated synchronization sub-state data set includes 10 synchronization sub-state data, namely, (K1-V1) to (K10-V10). First, the first committing node may classify all the synchronization sub-state data in the synchronization sub-state data set, for example, may classify the synchronization sub-state data according to a set order of the keys in the storage labels (or marked storage labels), and define that the quantity of synchronization sub-state data of each type included in the set does not exceed a type quantity threshold. The set order of keys may be an ascending order or a descending order. The type quantity threshold may be set according to actual application scenarios, for example, may be set to 3.

For example, in FIG. 4, (K1-V1), (K2-V2), and (K3-V3) are classified as a first type, (K4-V4), (K5-V5), and (K6-V6) are classified as a second type, (K7-V7), (K8-V8), and (K9-V9) are classified as a third type, and (K10-V10) alone is classified as a fourth type. After the classification, a hash operation is performed on the synchronization sub-state data of each type separately, to obtain a hash value corresponding to each type. For example, a hash operation is performed on (K1-V1), (K2-V2), and (K3-V3) to obtain a hash value h1, a hash operation is performed on (K4-V4), (K5-V5), and (K6-V6) to obtain a hash value h2, and so on. Then, a hash operation is performed on h1 and h2 to obtain an intermediate hash value h5; and a hash operation is performed on h3 and h4 to obtain an intermediate hash value h6. Finally, a hash operation is performed on the intermediate hash values h5 and h6 to obtain a root hash value h7. State data of a target structure is generated according to the calculated hash values. For example, a Merkle tree may be built based on the hash values, where the hash values h1, h2, h3, and h4 corresponding to the four types are used as leaf hash values of the Merkle tree, h5 and h6 are used as intermediate hash values of the Merkle tree, and h7 is used as a root hash value of the Merkle tree.

In step 208, the first committing node copies the state data of the target structure to generate the state data snapshot of the synchronization block height.

The first committing node copies the generated state data of the target structure to obtain the snapshot of the state data at the synchronous block height. For example, a state of the generated Merkle tree may be copied to obtain a snapshot of the Merkle tree, as shown in FIG. 4.

In step 209, the first committing node transmits the state data snapshot, the synchronization block height, and the signature information of the first committing node to the second committing node as the archiving point information.

For example, the first committing node signs the state data snapshot to obtain the signature information. Then, the first committing node packages the signature information, the state data snapshot, and the synchronization block height into the archiving point information, and transmits the archiving point information to the second committing node of the blockchain system.

As shown in FIG. 2B, in the embodiments of this application, the target sub-state data is selected according to the marked storage label, which can improve the efficiency and accuracy of selection; and the synchronization sub-state data set is updated according to the backed-up target sub-state data, which can ensure the data integrity and data accuracy of the updated synchronization sub-state data set.

Figure 2C:
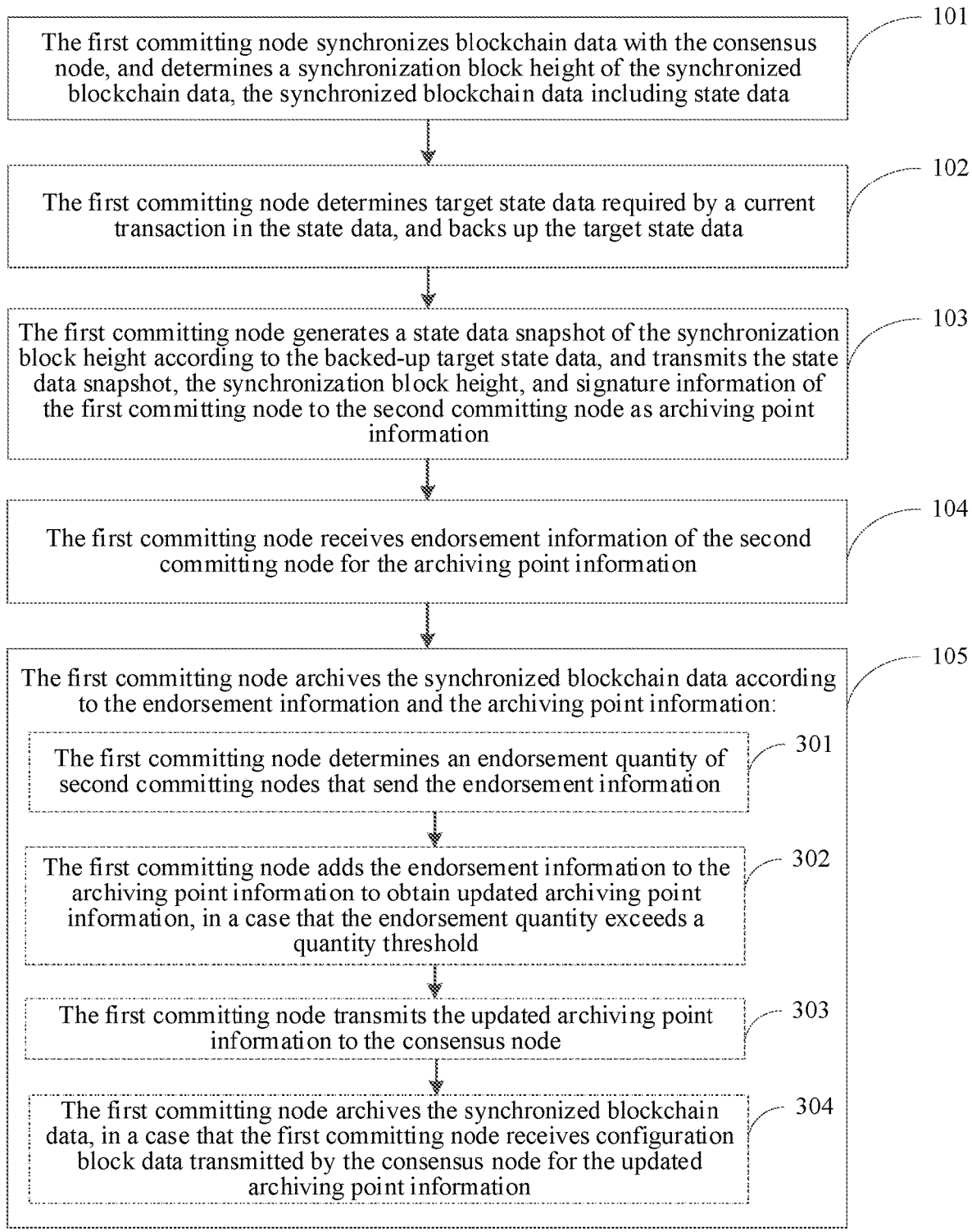
FIG. 2C is a schematic flowchart of a blockchain data archiving method according to an embodiment of this application.

In some embodiments, referring to FIG. 2C, FIG. 2C is a schematic flowchart of a blockchain data archiving method according to an embodiment of this application. Step 105 shown in FIG. 2A may be implemented through steps 301 to 304, which will be described in conjunction with the steps.

In step 301, the first committing node determines an endorsement quantity of second committing nodes that transmit the endorsement information.

For example, according to the received endorsement information, the first committing node determines a quantity of second committing nodes that transmit the endorsement information as the endorsement quantity. For example, if the first committing node has received 5 endorsement information, it may be determined that the quantity of second committing nodes that transmit the endorsement information is 5, that is, the endorsement quantity is 5.

In step 302, the first committing node adds the endorsement information to the archiving point information to obtain updated archiving point information, in a case that the endorsement quantity exceeds a quantity threshold.

The quantity threshold may be set according to actual application scenarios, for example, may be ½, ⅓, or other proportion of the total quantity of second committing nodes included in the blockchain system, or may be directly set to a value such as 3, 5, or 7. When the quantity of the second committing nodes that transmit the endorsement information exceeds the quantity threshold, the first committing node adds the endorsement information to the archiving point information to update the archiving point information, so as to obtain updated archiving point information. The endorsement information in the updated archiving point information and the signature information of the first committing node may together form signature evidence information for the state data of the synchronization block height.

In step 303, the first committing node transmits the updated archiving point information to the consensus node.

The first committing node transmits the updated archiving point information to the consensus node, and the consensus node determines whether to generate configuration block data according to the updated archiving point information. The configuration block data is obtained by the consensus node by generating a configuration block and storing the updated archiving point information in the configuration block.

In some embodiments, after step 303, the method further includes: selecting, by the consensus node, the endorsement information and the signature information from the updated archiving point information; verifying, by the consensus node, the endorsement information and the signature information; generating, by the consensus node, a configuration block in a case that the verification of the endorsement information and the signature information by the consensus node is passed, and storing the updated archiving point information in the configuration block to obtain configuration block data; and transmitting, by the consensus node, the configuration block data to the first committing node and the second committing node.

For example, the first committing node transmits the updated archiving point information to the consensus node, and the consensus node selects the endorsement information and the signature information from the updated archiving point information, and verifies the endorsement information and signature information, that is, verifies the signature evidence information composed of the endorsement information and the signature information of the first committing node.

For the endorsement information, the consensus node may verify the quantity of endorsement information. For example, when the quantity of endorsement information exceeds a quantity threshold (which may be the same as the quantity threshold in step 302), it is determined that the verification of the endorsement information is passed; when the quantity of endorsement information does not exceed the quantity threshold, it is determined that the verification of endorsement information is not passed. The consensus node may also verify the identity of the second committing node corresponding to the endorsement information. For example, when there is a second committing node corresponding to each endorsement information in the blockchain system, it is determined that the verification of the endorsement information is passed; when there is no second committing node corresponding to one or more endorsement information in the blockchain system, it is determined that the verification of the endorsement information is not passed. In a case of verifying the quantity of endorsement information and the identity of the second committing node corresponding to the endorsement information at the same time, it is determined that the verification of the endorsement information is passed only when the quantity of endorsement information exceeds the quantity threshold and there is a second committing node corresponding to each endorsement information in the blockchain system.

Regarding the signature information of the first committing node, the consensus node may verify the signature information of the first committing node according to at least one of a set signature format or signature rule. Taking the signature format as an example, when the signature information of the first committing node conforms to the signature format, it is determined that the verification of the signature information is passed; when the signature information of the first committing node does not conform to the signature format, it is determined that the verification of the signature information is not passed. The same applies to the verification process according to the signature rule. In the case of verifying the signature information of the first committing node according to the signature format and the signature rule, it is determined that the verification of the signature information is passed only when the signature information of the first committing node conforms to both the signature format and the signature rule.

The rule for verifying the endorsement information and the signature information by the consensus node is not limited to the above examples, and may be set according to actual application scenarios. For example, the endorsement information may be verified according to a particular endorsement rule or endorsement requirement. The consensus node generates a configuration block in a case that the verification of the endorsement information and the signature information by the consensus node is passed, and stores the updated archiving point information in the configuration block to obtain configuration block data. Then, the consensus node transmits the configuration block data to the first committing node and the second committing node. By the above method, effective verification of the updated archiving point information is realized, thereby improving the validity of data archiving and effectively avoiding malicious archiving.

In step 304, the first committing node archives the synchronized blockchain data, in a case that the first committing node receives configuration block data transmitted by the consensus node for the updated archiving point information.

When the first committing node receives the configuration block data transmitted by the consensus node for the updated archiving point information, it indicates that the consensus node has approved the updated archiving point information, so the first committing node archives the synchronized blockchain data.

In some embodiments, the first committing node may archive the synchronized blockchain data in the following manner: copying, by the first committing node, the updated archiving point information to generate an archiving data snapshot of the first committing node at the synchronization block height; adding, by the first committing node, the configuration block data to the first block data to obtain updated first block data; selecting, by the first committing node, target block data whose block height does not exceed the synchronization block height from the updated first block data; and deleting, by the first committing node, the target block data.

For example, the first committing node copies the synchronization block height, the signature information, and the endorsement information in the updated archiving point information to obtain data snapshots corresponding to these data, generates an archiving data snapshot of the synchronization block height according to the data snapshots corresponding to these data and the state data snapshot in the updated archiving point information, and stores the archiving data snapshot locally.

Figure 5:
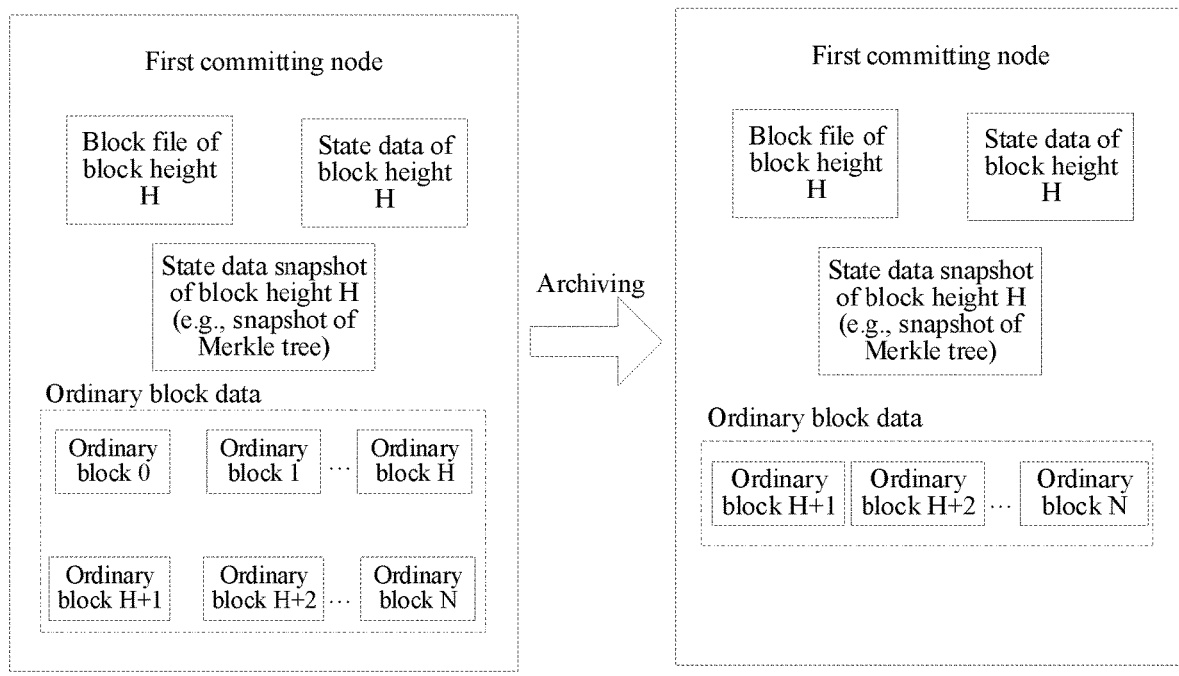
FIG. 5 is a schematic diagram of archiving blockchain data by a first committing node according to an embodiment of this application.

At the same time, the first committing node adds the configuration block data to the first block data to update the first block data, so as to obtain updated first block data. The first block data refers to blocks included in the synchronized blockchain data. The first committing node selects block data whose block height does not exceed the synchronization block height from the updated first block data. For ease of distinguishing, the selected block data is referred to as target block data. As an example, the embodiments of this application provide a schematic diagram of data archiving as shown in FIG. 5, where the synchronization block height is H, ordinary block data is selected from the updated first block data, and ordinary blocks whose block height does not exceed H are further selected from the selected ordinary block data as target block data. In FIG. 5, the target block data includes ordinary blocks 0 to H. The ordinary block data refers to block data in the updated first block data that is different from the configuration block data. In addition, H in FIG. 5 is an integer greater than or equal to 0, and N is an integer greater than H. After obtaining the target block data, the first committing node may delete the target block data. As shown in FIG. 5, the first committing node deletes the ordinary blocks 0 to H.

In some embodiments, after step 303, the method further includes: copying, by the second committing node, the signature information, the endorsement information, the state data snapshot, and the synchronization block height in the configuration block data to obtain the archiving data snapshot of the synchronization block height, in a case that the second committing node receives the configuration block data transmitted by the consensus node; and adding, by the second committing node, the configuration block data to blockchain data of the second committing node, and selecting target block data whose block height does not exceed the synchronization block height from the updated blockchain data of the second committing node; and deleting, by the second committing node, the target block data.

After generating the configuration block data, the consensus node transmits the configuration block data to the first committing node and the second committing node. When the second committing node receives the configuration block data, the second committing node extracts the signature information, the endorsement information, the state data snapshot, and the synchronization block height from the configuration block data, copies the extracted data to obtain an archiving data snapshot of the synchronization block height, and stores the archiving data snapshot locally.

At the same time, the second committing node may also add the configuration block data to the local blockchain data of the second committing node to obtain updated blockchain data of the second committing node. Then, the second committing node selects target block data whose block height does not exceed the synchronization block height (which is referred to as target block data of the second committing node for ease of distinguishing) from the updated blockchain data of the second committing node, and deletes the target block data of the second committing node to complete the data archiving. By the above method, while the first committing node performs data archiving, data archiving of the second committing node can also be realized, thereby saving the storage resources of all committing nodes in the blockchain system.

Figure 6:
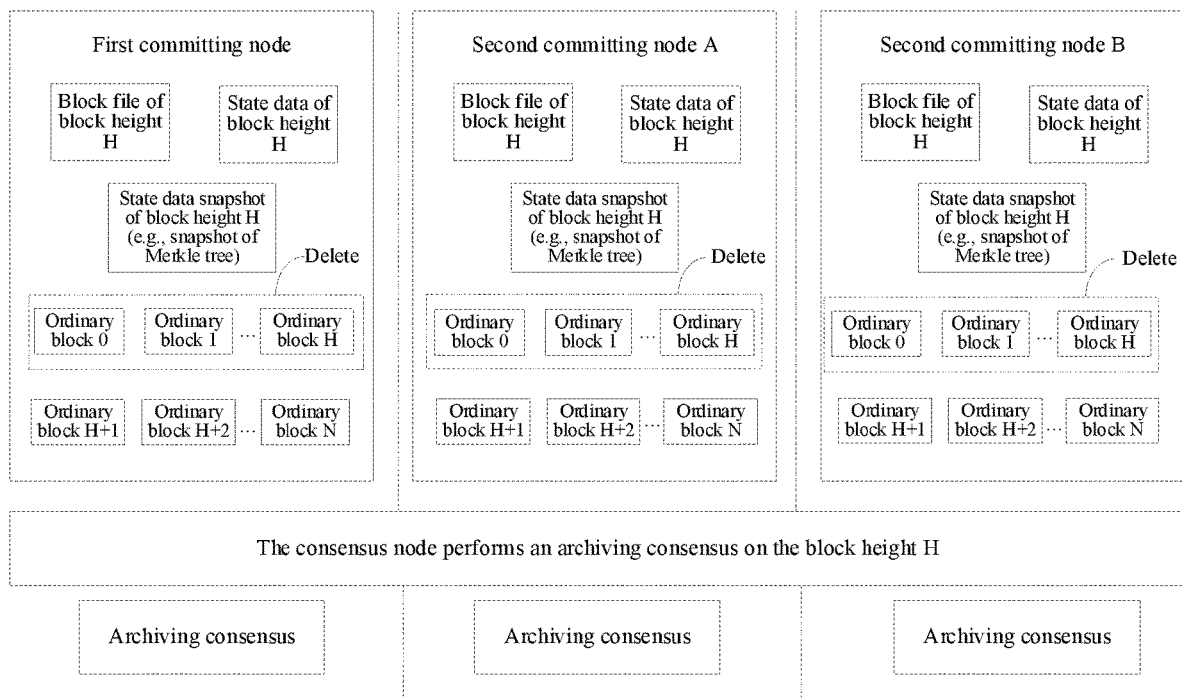
FIG. 6 is a schematic flowchart of blockchain data archiving in a blockchain system according to an embodiment of this application.

The processes of archiving the target block data not exceeding the synchronization block height that are respectively performed by the first committing node and the second committing node may be performed at the same time or not. The entire archiving process may be as shown in FIG. 6. An archiving consensus in FIG. 6 refers to an operation performed by the consensus nodes during the data archiving process. In the process of data archiving, the target block data may also be stored in a distributed storage system, where the distributed storage system is different from the blockchain system. The distributed storage system may be used for cold storage, that is, data therein is not frequently accessed. The blockchain system may be used for hot storage, that is, data stored therein is frequently accessed.

In some embodiments, between any steps, the method further includes: transmitting, by the first committing node, a synchronization request to the consensus node in a case that the first committing node is a newly added committing node in the blockchain system, and receiving endorsement information and archiving point information transmitted by the consensus node for the synchronization request; obtaining, by the first committing node, state data from the second committing node according to the endorsement information and the archiving point information; obtaining, by the first committing node, second block data whose block height exceeds the synchronization block height from the consensus node or the second committing node; and updating, by the first committing node, the state data according to transaction information in the second block data to obtain current blockchain data of the first committing node.

When the first committing node is a newly added committing node in the blockchain system, the first committing node needs to obtain, from the blockchain system, blockchain data to be stored locally. That is to say, in the embodiments of this application, in addition to the need for data archiving, there is also a need for data obtaining.

For the need of data obtaining, the first committing node may transmit a synchronization request to the consensus node. When receiving the synchronization request, the consensus node transmits endorsement information and archiving point information for the synchronization request to the first committing node. The first committing node obtains state data from the second committing node according to the received endorsement information and archiving point information. The first committing node may also obtain block data whose block height exceeds the synchronization block height from the consensus node or the second committing node. For ease of distinguishing, the block data obtained here is referred to as second block data. The synchronization block height here may refer to a synchronization block height obtained after the second committing node synchronizes the blockchain data. For example, when the synchronization block height is 5, the first committing node obtains block data whose block height exceeds 5 from the consensus node or the second committing node as the second block data. Then, the first committing node updates the state data according to transaction information in the second block data, for example, may update a world state of the first committing node by playback of transactions in the blocks included in the second block data, so to be synchronized with the latest world state in the consensus node and the second committing node, and obtain current blockchain data of the first committing node. By the above method, the newly added committing node in the blockchain system can obtain accurate and valid current blockchain data, thereby improving the accuracy of data obtaining.

In some embodiments, the first committing node may obtain the state data from the second committing node according to the endorsement information and the archiving point information in the following manner: verifying, by the first committing node, the endorsement information and the signature information of the second committing node; determining, by the first committing node, a plurality of leaf hash values corresponding to the root hash value, in a case that the verification of the endorsement information and the signature information of the second committing node by the first committing node is passed; and obtaining, by the first committing node, sub-state data corresponding to different leaf hash values in parallel from the second committing node as the obtained state data.

When receiving the endorsement information and the archiving point information, the first committing node may verify the signature information of the second committing node (which refers to the committing node that performs data archiving) in the endorsement information and the archiving point information. The verification rule is not limited herein, and may be the verification rule of the consensus node described above.

Figure 7:
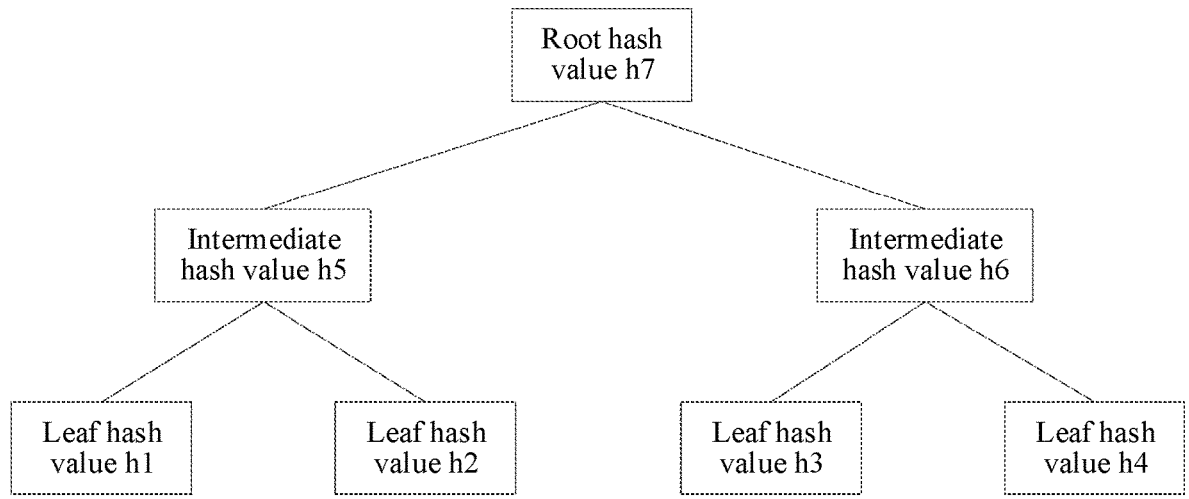
FIG. 7 is a schematic structural diagram of a Merkle tree corresponding to state data according to an embodiment of this application.

When the verification of the endorsement information and the signature information of the second committing node by the first committing node is passed, the first committing node determines a plurality of corresponding leaf hash values according to the root hash value in the archiving point information. The archiving point information received by the first committing node includes a root hash value of state data of the consensus node and the signature information of the second committing node. For example, the Merkle tree corresponding to the state data (that is, the target structure) is as shown in FIG. 7, where the root hash value is h7. In this case, the first committing node may determine the leaf hash values including h1, h2, h3, and h4 corresponding to the root hash value according to the Merkle tree.

After obtaining a plurality of leaf hash values, the first committing node may obtain sub-state data corresponding to different leaf hash values in parallel from the second committing node, and use all the obtained sub-state data as the obtained state data. The first committing node may obtain the sub-state data corresponding to all the leaf hash values from a single second committing node, or may obtain different sub-state data from different second committing nodes. By the above method, the accuracy of the obtained state data can be ensured.

In some embodiments, the first committing node may obtain the sub-state data corresponding to different leaf hash values in parallel from the second committing node in the following manner: classifying, by the first committing node, the plurality of leaf hash values according to a quantity of the second committing nodes; determining, by the first committing node, target leaf hash values corresponding to the different second committing nodes according to a result of the classification of the plurality of leaf hash values; and obtaining, by the first committing node, sub-state data corresponding to the target leaf hash values from the different second committing nodes.

For example, if the quantity of second committing nodes in the blockchain system is 2, the first committing node may classify h1 and h2 as one category and classify h3 and h4 as another category. Then, the first committing node determines the target leaf hash values corresponding to the second committing nodes according to a result of the classification. For example, the first committing node may use h1 and h2 as target leaf hash values corresponding to a second committing node A, and use h3 and h4 as target leaf hash values corresponding to a second committing node B.

Figure 8:
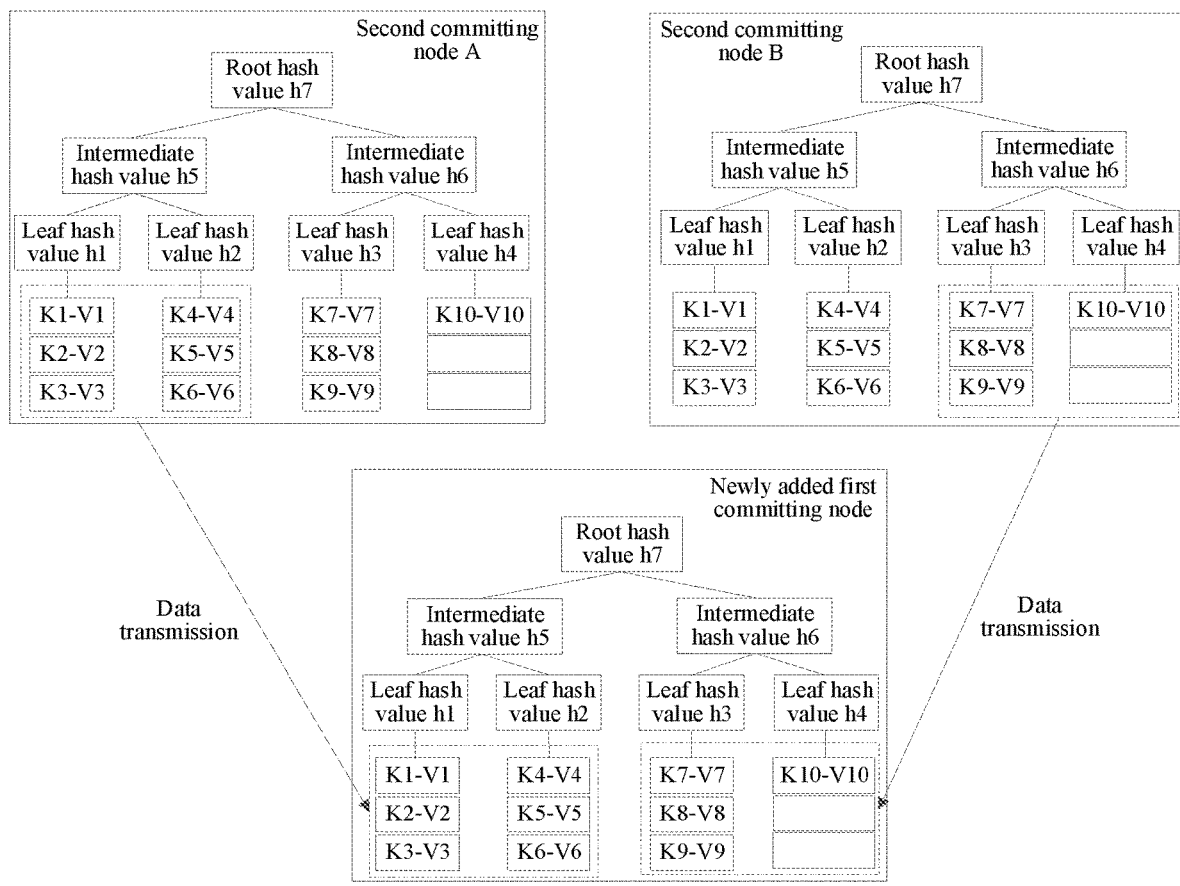
FIG. 8 is a schematic flowchart of building a local world state by a first committing node according to an embodiment of this application.

For each second committing node, the first committing node obtains the sub-state data corresponding to the target leaf hash value from the second committing node according to the target leaf hash value corresponding to the second committing node. As shown in FIG. 8, the first committing node may obtain sub-state data (K1-V1) to (K3-V3) corresponding to h1 and sub-state data (K4-V4) to (K6-V6) corresponding to h2 from the second committing node A), and obtain sub-state data (K7-V7) to (K9-V9) corresponding to h3 and sub-state data (K10-V10) corresponding to h4 from the second committing node B. The first committing node may construct a local world state of the first committing node by using the obtained state data. By the above method, different sub-state data is obtained from different second committing nodes, which can reduce the processing load of each second committing node, and can also improve the accuracy of the obtained state data.

As shown in FIG. 2C, in the embodiments of this application, the updated archiving point information is transmitted to the consensus node, and when the configuration block data transmitted by the consensus node for the updated archiving point information is received, the synchronized blockchain data is archived, so that the effectiveness and accuracy of archiving can be effectively improved.

Figure 9:
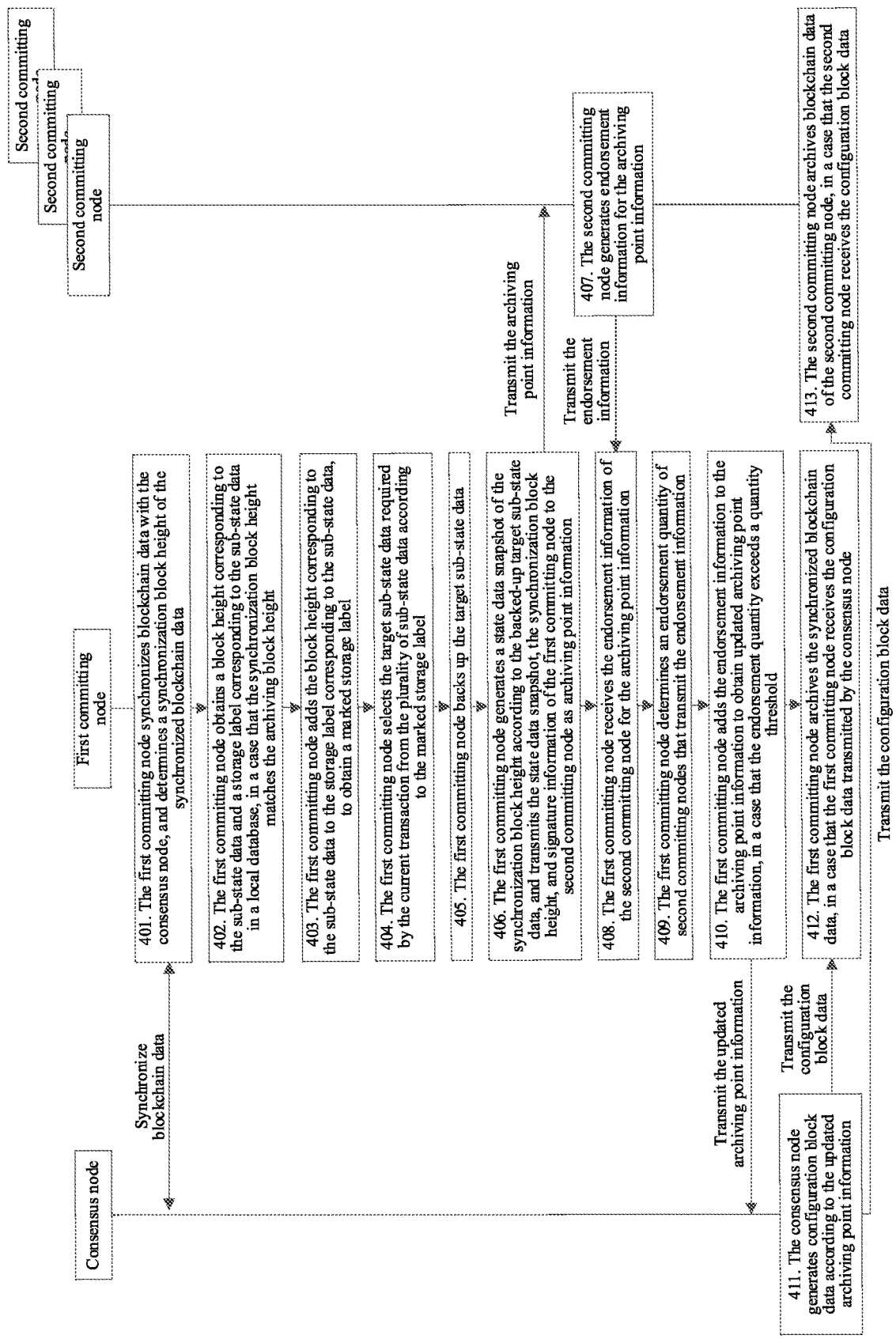
FIG. 9 is a schematic flowchart of a blockchain data archiving method according to an embodiment of this application.

According to the method described in the foregoing embodiments, the following further provides detailed descriptions by using examples. Referring to FIG. 9, FIG. 9 is a schematic flowchart of a blockchain data archiving method according to an embodiment of this application. The method will be described with reference to steps shown in FIG. 9.

In step 401, the first committing node synchronizes blockchain data with the consensus node, and determines a synchronization block height of the synchronized blockchain data.

In step 402, the first committing node obtains a block height corresponding to the sub-state data and a storage label corresponding to the sub-state data in a local database, in a case that the synchronization block height matches the archiving block height.

In step 403, the first committing node adds the block height corresponding to the sub-state data to the storage label corresponding to the sub-state data for marking, to obtain a marked storage label.

In step 404, the first committing node selects the target sub-state data required by the current transaction from the plurality of sub-state data according to the marked storage label.

In step 405, the first committing node backs up the target sub-state data.

In step 406, the first committing node generates a state data snapshot of the synchronization block height according to the backed-up target state data, and transmits the state data snapshot, the synchronization block height, and signature information of the first committing node to the second committing node as archiving point information.

In step 407, the second committing node generates endorsement information for the archiving point information, and transmits the endorsement information to the first committing node.

In step 408, the first committing node receives the endorsement information of the second committing node for the archiving point information.

In step 409, the first committing node determines an endorsement quantity of second committing nodes that transmit the endorsement information.

In step 410, the first committing node adds the endorsement information to the archiving point information to obtain updated archiving point information, in a case that the endorsement quantity exceeds a quantity threshold; and transmits the updated archiving point information to the consensus node.

In step 411, the consensus node generates configuration block data according to the updated archiving point information, and transmits the configuration block data to the first committing node and the second committing node.

In step 412, the first committing node archives the synchronized blockchain data, in a case that the first committing node receives the configuration block data transmitted by the consensus node.

In step 413, the second committing node archives blockchain data of the second committing node, in a case that the second committing node receives configuration block data.

In some embodiments, when the first committing node is a newly added committing node in the blockchain system, the first committing node may obtain latest blockchain data from the blockchain system, which will be described with reference to steps shown in FIG. 10.

In step 414, the first committing node transmits a synchronization request to the consensus node.

In step 415, the consensus node transmits the endorsement information and the archiving point information to the first committing node according to the synchronization request.

In step 416, the first committing node obtains state data from the second committing node according to the endorsement information and the archiving point information.

In step 417, the first committing node obtains second block data whose block height exceeds the synchronization block height from the consensus node or the second committing node.

In step 418, the first committing node updates the state data according to transaction information in the second block data to obtain current blockchain data of the first committing node.

Figure 10:
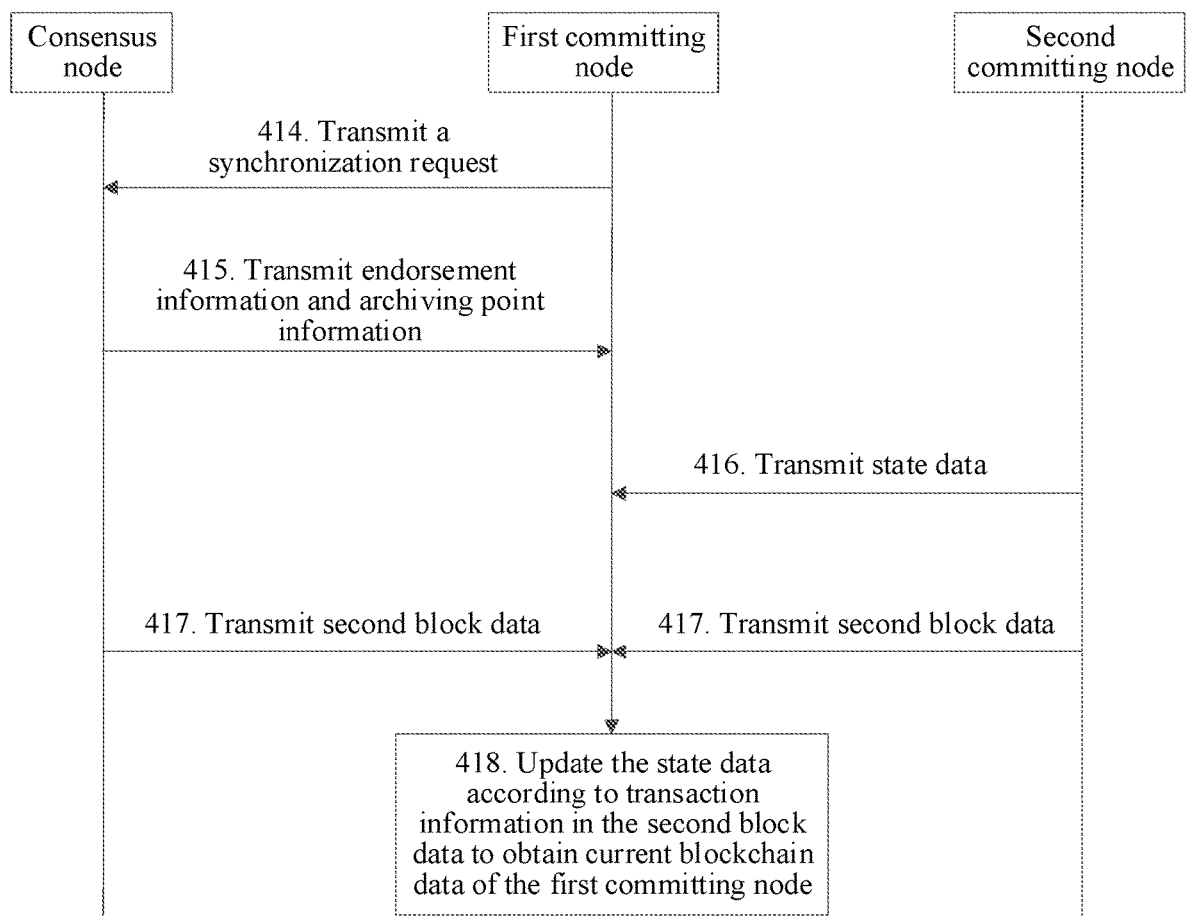
FIG. 10 is a schematic flowchart of obtaining latest blockchain data by a first committing node according to an embodiment of this application.

As shown in FIG. 9 and FIG. 10, in the embodiments of this application, by backing up the target state data required by the current transaction and generating a state data snapshot based on the backed-up target state data, the conflict between the snapshot and the original transaction is solved, and a real-time snapshot of the state data is achieved. In addition, the other committing nodes in the blockchain system sign and endorse information such as the state data snapshot, which makes the information credible. Therefore, the efficiency and precision of blockchain data archiving can be greatly improved. In addition, in the embodiments of this application, in addition to data archiving, information such as endorsement information, archiving point information, and second block data may be transmitted to a newly added committing node, so that the newly added committing node can obtain accurate current blockchain data, that is, can obtain a concise and accurate ledger.

The present disclosure describes a blockchain data archiving method, applicable to a blockchain system. The blockchain system may include a consensus node, a first committing node, and a second committing node. The method may include a portion or all of the following: synchronizing, by the first committing node, blockchain data with the consensus node, and determining a synchronization block height of the synchronized blockchain data, the synchronized blockchain data comprising state data; determining, by the first committing node, target state data required by a current transaction in the state data, and backing up the target state data; generating, by the first committing node, a state data snapshot of the synchronization block height according to the backed-up target state data, and transmitting the state data snapshot, the synchronization block height, and signature information of the first committing node to the second committing node as archiving point information; receiving, by the first committing node, endorsement information of the second committing node for the archiving point information; and archiving, by the first committing node, the synchronized blockchain data according to the endorsement information and the archiving point information.

In some implementations, the state data comprises a plurality of sub-state data; and/or the determining, by the first committing node, target state data required by a current transaction in the state data, and backing up the target state data comprises: obtaining, by the first committing node, a block height corresponding to the sub-state data and a storage label corresponding to the sub-state data in a local database; adding, by the first committing node, the block height corresponding to the sub-state data to the storage label corresponding to the sub-state data for marking, to obtain a marked storage label; selecting, by the first committing node, the target sub-state data required by the current transaction from the plurality of sub-state data according to the marked storage label; and/or backing up, by the first committing node, the target sub-state data.

In some other implementations, the selecting, by the first committing node, the target sub-state data required by the current transaction from the plurality of sub-state data according to the marked storage label comprises: obtaining, by the first committing node, transaction information corresponding to the current transaction; determining, by the first committing node, a current block height of current blockchain data of the first committing node according to the transaction information; determining, by the first committing node, that a new block exists in the current blockchain data, in a case that the current block height exceeds the synchronization block height; selecting, by the first committing node, invocation information required by a transaction in the new block from the current blockchain data, the invocation information being used for indicating the sub-state data to be invoked; and/or selecting, by the first committing node, the target sub-state data from the plurality of sub-state data according to the invocation information and the marked storage label.

In some other implementations, the backing up, by the first committing node, the target sub-state data comprises: selecting, by the first committing node, transaction operation information required by the transaction in the new block from the transaction information; determining, by the first committing node, a transaction operation type corresponding to the target sub-state data according to the transaction operation information; backing up, by the first committing node in a case that the transaction operation type is an update operation, the target sub-state data corresponding to the update operation; and/or backing up, by the first committing node in a case that the transaction operation type is a deletion operation, the target sub-state data corresponding to the deletion operation, and adding a deletion label to the backed-up target sub-state data, the deletion label being used for indicating that the backed-up target sub-state data cannot be read during execution of the transaction.

In some other implementations, the generating, by the first committing node, a state data snapshot of the synchronization block height according to the backed-up target state data comprises: selecting, by the first committing node, synchronization sub-state data whose block height does not exceed the synchronization block height from the state data, to obtain a synchronization sub-state data set; adding, by the first committing node, the backed-up target sub-state data as new synchronization sub-state data to the synchronization sub-state data set to update the synchronization sub-state data set; performing, by the first committing node, a hash operation on the synchronization sub-state data in the updated synchronization sub-state data set to generate state data of a target structure; and/or copying, by the first committing node, the state data of the target structure to generate the state data snapshot of the synchronization block height.

In some other implementations, the performing, by the first committing node, a hash operation on the synchronization sub-state data in the updated synchronization sub-state data set to generate state data of a target structure comprises: classifying, by the first committing node, a plurality of synchronization sub-state data in the updated synchronization sub-state data set to obtain a plurality of types of synchronization sub-state data; performing, by the first committing node, a hash operation on the plurality of types of synchronization sub-state data respectively, to obtain leaf hash values respectively corresponding to the plurality of types of synchronization sub-state data; performing, by the first committing node, a hash operation according to the leaf hash values respectively corresponding to the plurality of types of synchronization sub-state data, to obtain a root hash value; and/or generating, by the first committing node, the state data of the target structure according to the root hash value and the leaf hash values respectively corresponding to the plurality of types of synchronization sub-state data.

In some other implementations, the archiving, by the first committing node, the synchronized blockchain data according to the endorsement information and the archiving point information comprises: determining, by the first committing node, an endorsement quantity of second committing nodes that transmit the endorsement information; adding, by the first committing node, the endorsement information to the archiving point information to obtain updated archiving point information, in a case that the endorsement quantity exceeds a quantity threshold; transmitting, by the first committing node, the updated archiving point information to the consensus node; and/or archiving, by the first committing node, the synchronized blockchain data, in a case that the first committing node receives configuration block data transmitted by the consensus node for the updated archiving point information.

In some other implementations, the synchronized blockchain data comprises first block data; and/or the archiving, by the first committing node, the synchronized blockchain data comprises: copying, by the first committing node, the updated archiving point information to generate an archiving data snapshot of the first committing node at the synchronization block height; adding, by the first committing node, the configuration block data to the first block data to obtain updated first block data; selecting, by the first committing node, target block data whose block height does not exceed the synchronization block height from the updated first block data; and/or deleting, by the first committing node, the target block data.

In some other implementations, during the deleting, by the first committing node, the target block data, the method further comprises: storing, by the first committing node, the target block data in a distributed storage system, the distributed storage system being different from the blockchain system.

In some other implementations, after the transmitting, by the first committing node, the updated archiving point information to the consensus node, the method further comprises: selecting, by the consensus node, the endorsement information and the signature information from the updated archiving point information; verifying, by the consensus node, the endorsement information and the signature information; generating, by the consensus node, a configuration block in a case that the verification of the endorsement information and the signature information by the consensus node is passed, and storing the updated archiving point information in the configuration block to obtain configuration block data; and/or transmitting, by the consensus node, the configuration block data to the first committing node and the second committing node.

In some other implementations, the verifying, by the consensus node, the endorsement information and the signature information comprises: verifying, by the consensus node, at least one of a quantity of the endorsement information or an identity of the second committing node corresponding to the endorsement information; and/or verifying, by the consensus node, the signature information according to at least one of a signature format or a signature rule.

In some other implementations, the method further comprises: extracting, by the first committing node, a root hash value of state data of the second committing node from the archiving point information, in a case that the first committing node receives the archiving point information transmitted by the second committing node; comparing, by the first committing node, the root hash value of the state data of the second committing node with a root hash value of state data of the first committing node; signing, by the first committing node, the archiving point information to obtain endorsement information for the archiving point information, in a case that the root hash value of the state data of the second committing node is the same as the root hash value of the state data of the first committing node; and/or transmitting, by the first committing node, the endorsement information to the second committing node, and broadcasting the archiving point information in the blockchain system.

In some other implementations, the method further comprises: transmitting, by the first committing node, a synchronization request to the consensus node in a case that the first committing node is a newly added committing node in the blockchain system, and receiving endorsement information and archiving point information transmitted by the consensus node for the synchronization request; obtaining, by the first committing node, state data from the second committing node according to the endorsement information and the archiving point information; obtaining, by the first committing node, second block data whose block height exceeds the synchronization block height from the consensus node or the second committing node; and/or updating, by the first committing node, the state data according to transaction information in the second block data to obtain current blockchain data of the first committing node.

In some other implementations, the archiving point information comprises a root hash value of state data of the consensus node and signature information of the second committing node; and/or the obtaining, by the first committing node, state data from the second committing node according to the endorsement information and the archiving point information comprises: verifying, by the first committing node, the endorsement information and the signature information of the second committing node; determining, by the first committing node, a plurality of leaf hash values corresponding to the root hash value, in a case that the verification of the endorsement information and the signature information of the second committing node by the first committing node is passed; and/or obtaining, by the first committing node, sub-state data corresponding to different leaf hash values in parallel from the second committing node as the obtained state data.

In some other implementations, the obtaining, by the first committing node, sub-state data corresponding to different leaf hash values in parallel from the second committing node as the obtained state data comprises: classifying, by the first committing node, the plurality of leaf hash values according to a quantity of the second committing nodes; determining, by the first committing node, target leaf hash values corresponding to the different second committing nodes according to a result of the classification of the plurality of leaf hash values; and/or obtaining, by the first committing node, sub-state data corresponding to the target leaf hash values from the different second committing nodes.

In some other implementations, the synchronizing, by the first committing node, blockchain data with the consensus node comprises: transmitting, by the first committing node, a synchronization request to the consensus node, the synchronization request comprising an identity of the first committing node; receiving, by the first committing node, a block transmitted by the consensus node for the synchronization request, the block being transmitted by the consensus node after successfully verifying the identity of the first committing node in the synchronization request; and/or updating, by the first committing node, local blockchain data according to the block transmitted by the consensus node, to obtain the synchronized blockchain data.

In some other implementations, the determining, by the first committing node, target state data required by a current transaction in the state data comprises: matching, by the first committing node, the synchronization block height against an archiving block height; and/or determining, by the first committing node, the target state data required by the current transaction in the state data, in a case that the synchronization block height matches the archiving block height.

To better implement the foregoing method, the embodiments of this application further provide a blockchain data archiving apparatus. The blockchain data archiving apparatus may be integrated in an electronic device, for example, a device such as a server or a terminal. The terminal may include a tablet computer, a notebook computer, and/or a personal computer.

Figure 11:
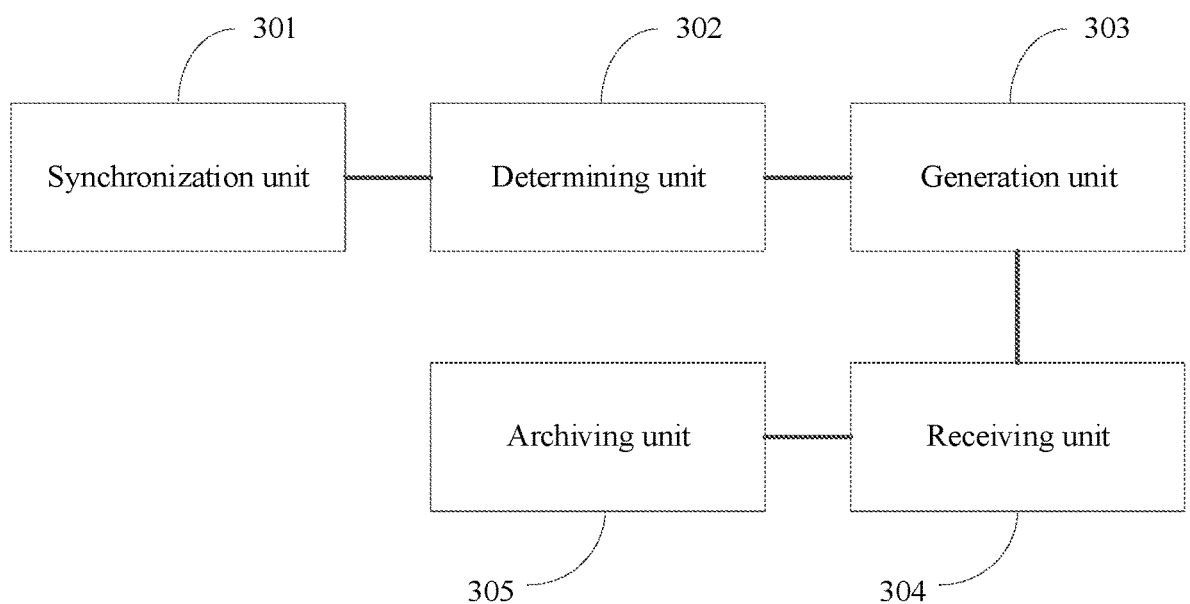
FIG. 11 is a schematic structural diagram of a blockchain data archiving apparatus according to an embodiment of this application.

For example, as shown in FIG. 11, the blockchain data archiving apparatus may include a synchronization unit 301, a determining unit 302, a generation unit 303, a receiving unit 304, and an archiving unit 305. The synchronization unit 301 is configured to synchronize, by the first committing node, blockchain data with the consensus node, and determine a synchronization block height of the synchronized blockchain data, the synchronized blockchain data including state data. The determining unit 302 is configured to determine, by the first committing node, target state data required by a current transaction in the state data, and back up the target state data. The generation unit 303 is configured to generate, by the first committing node, a state data snapshot of the synchronization block height according to the backed-up target state data, and transmit the state data snapshot, the synchronization block height, and signature information of the first committing node to the second committing node as archiving point information. The receiving unit 304 is configured to receive, by the first committing node, endorsement information of the second committing node for the archiving point information. The archiving unit 305 is configured to archive, by the first committing node, the synchronized blockchain data according to the endorsement information and the archiving point information.

Figure 12:
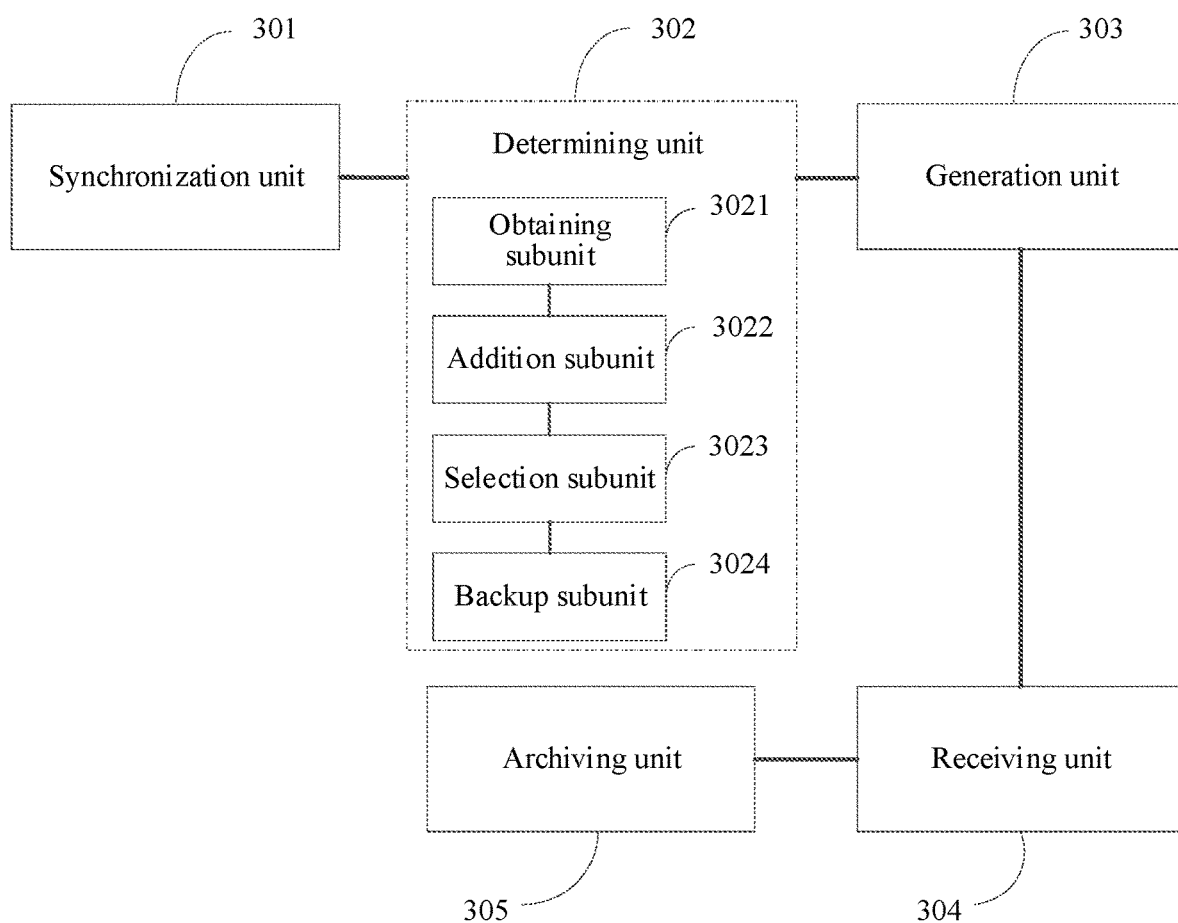
FIG. 12 is a schematic structural diagram of a blockchain data archiving apparatus according to an embodiment of this application.

In some embodiments, the state data includes a plurality of sub-state data, and the determining unit 302 may include an obtaining subunit 3021, an addition subunit 3022, a selection subunit 3023, and a backup subunit 3024, as shown in FIG. 12. The obtaining subunit 3021 is configured to obtain, by the first committing node, a block height corresponding to the sub-state data and a storage label corresponding to the sub-state data in a local database. The addition subunit 3022 is configured to add, by the first committing node, the block height corresponding to the sub-state data to the storage label corresponding to the sub-state data for marking, to obtain a marked storage label; The selection subunit 3023 is configured to select, by the first committing node, the target sub-state data required by the current transaction from the plurality of sub-state data according to the marked storage label; and The backup subunit 3024 is configured to back up, by the first committing node, the target sub-state data.

In some embodiments, the selection subunit 3023 is configured to: obtain, by the first committing node, transaction information corresponding to the current transaction; determine, by the first committing node, a current block height of current blockchain data of the first committing node according to the transaction information; determine, by the first committing node, that a new block exists in the current blockchain data, in a case that the current block height exceeds the synchronization block height; select, by the first committing node, invocation information required by a transaction in the new block from the current blockchain data, the invocation information being used for indicating the sub-state data to be invoked; and select, by the first committing node, the target sub-state data from the plurality of sub-state data according to the invocation information and the marked storage label.

In some embodiments, the backup subunit 3024 is configured to: select, by the first committing node, transaction operation information required by the transaction in the new block from the transaction information; determine, by the first committing node, a transaction operation type corresponding to the target sub-state data according to the transaction operation information; back up, by the first committing node in a case that the transaction operation type is an update operation, the target sub-state data corresponding to the update operation; and back up, by the first committing node in a case that the transaction operation type is a deletion operation, the target sub-state data corresponding to the deletion operation, and adding a deletion label to the backed-up target sub-state data, the deletion label being used for indicating that the backed-up target sub-state data cannot be read during execution of the transaction.

In some embodiments, the generation unit 303 is configured to: select, by the first committing node, synchronization sub-state data whose block height does not exceed the synchronization block height from the state data, to obtain a synchronization sub-state data set; add, by the first committing node, the backed-up target sub-state data as new synchronization sub-state data to the synchronization sub-state data set to update the synchronization sub-state data set; perform, by the first committing node, a hash operation on the synchronization sub-state data in the updated synchronization sub-state data set to generate state data of a target structure; and copy, by the first committing node, the state data of the target structure to generate the state data snapshot of the synchronization block height.

In some embodiments, the generation unit 303 is configured to: classify, by the first committing node, a plurality of synchronization sub-state data in the updated synchronization sub-state data set to obtain a plurality of types of synchronization sub-state data; perform, by the first committing node, a hash operation on the plurality of types of synchronization sub-state data respectively, to obtain leaf hash values respectively corresponding to the plurality of types of synchronization sub-state data; perform, by the first committing node, a hash operation according to the leaf hash values respectively corresponding to the plurality of types of synchronization sub-state data, to obtain a root hash value; and generate, by the first committing node, the state data of the target structure according to the root hash value and the leaf hash values respectively corresponding to the plurality of types of synchronization sub-state data.

Figure 13:
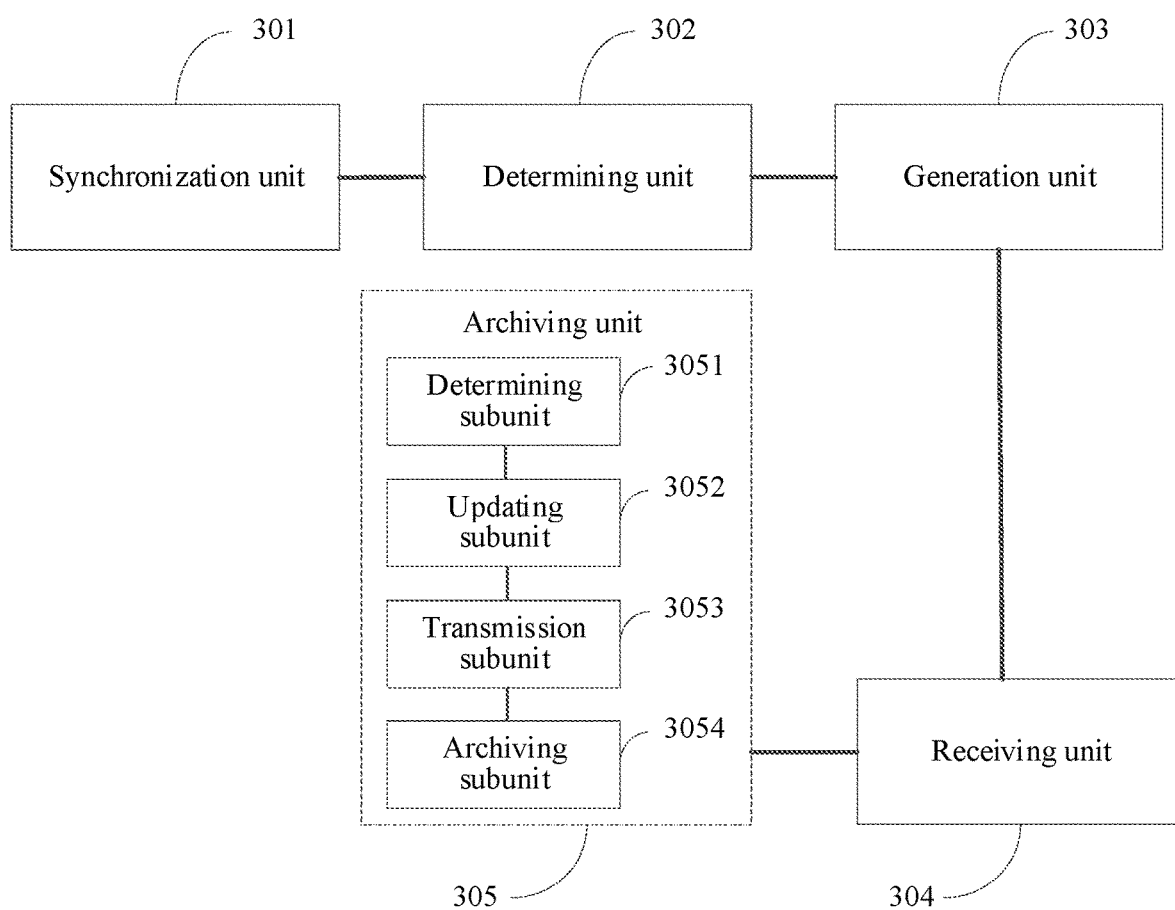
FIG. 13 is a schematic structural diagram of a blockchain data archiving apparatus according to an embodiment of this application.

In some embodiments, the archiving unit 305 may include a determining subunit 3051, an updating subunit 3052, a transmission subunit 3053, and an archiving subunit 3054, as shown in FIG. 13. The determining subunit 3051 is configured to determine, by the first committing node, an endorsement quantity of second committing nodes that transmit the endorsement information. The updating subunit 3052 is configured to add, by the first committing node, the endorsement information to the archiving point information to obtain updated archiving point information, in a case that the endorsement quantity exceeds a quantity threshold; The transmission subunit 3053 is configured to transmit, by the first committing node, the updated archiving point information to the consensus node; and The archiving subunit 3054 is configured to archive, by the first committing node, the synchronized blockchain data, in a case that the first committing node receives configuration block data transmitted by the consensus node for the updated archiving point information.

In some embodiments, the synchronized blockchain data includes first block data; and the archiving subunit 3054 is configured to: copy, by the first committing node, the updated archiving point information to generate an archiving data snapshot of the first committing node at the synchronization block height; add, by the first committing node, the configuration block data to the first block data to obtain updated first block data; select, by the first committing node, target block data whose block height does not exceed the synchronization block height from the updated first block data; and delete, by the first committing node, the target block data.

In some embodiments, the archiving subunit 3054 is configured to: store, by the first committing node, the target block data in a distributed storage system, in a case that the first committing node deletes the target block data, the distributed storage system being different from the blockchain system.

In some embodiments, the transmission subunit 3053 is configured to: select, by the consensus node, the endorsement information and the signature information from the updated archiving point information; verify, by the consensus node, the endorsement information and the signature information; generate, by the consensus node, a configuration block in a case that the verification of the endorsement information and the signature information by the consensus node is passed, and store the updated archiving point information in the configuration block to obtain configuration block data; and transmit, by the consensus node, the configuration block data to the first committing node and the second committing node.

In some embodiments, the transmission subunit 3053 is configured to: verify, by the consensus node, at least one of a quantity of the endorsement information or an identity of the second committing node corresponding to the endorsement information; and verify, by the consensus node, the signature information according to at least one of a signature format or a signature rule.

Figure 14:
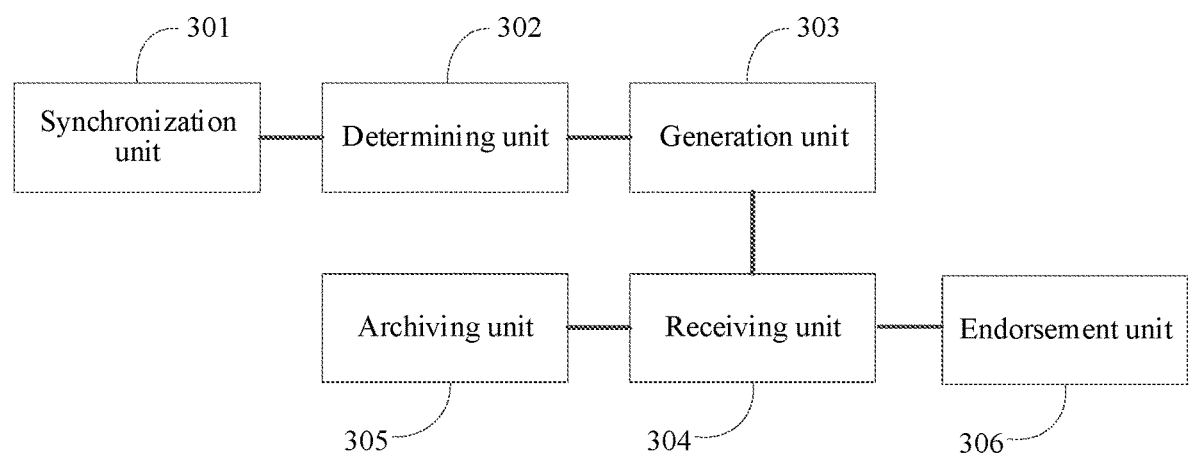
FIG. 14 is a schematic structural diagram of a blockchain data archiving apparatus according to an embodiment of this application.

In some embodiments, the blockchain data archiving apparatus may further include an endorsement unit 306, as shown in FIG. 14. The endorsement unit 306 is configured to: extract, by the first committing node, a root hash value of state data of the second committing node from the archiving point information, in a case that the first committing node receives the archiving point information transmitted by the second committing node; compare, by the first committing node, the root hash value of the state data of the second committing node with a root hash value of state data of the first committing node; sign, by the first committing node, the archiving point information to obtain endorsement information for the archiving point information, in a case that the root hash value of the state data of the second committing node is the same as the root hash value of the state data of the first committing node; and transmit, by the first committing node, the endorsement information to the second committing node, and broadcast the archiving point information in the blockchain system.

Figure 15:
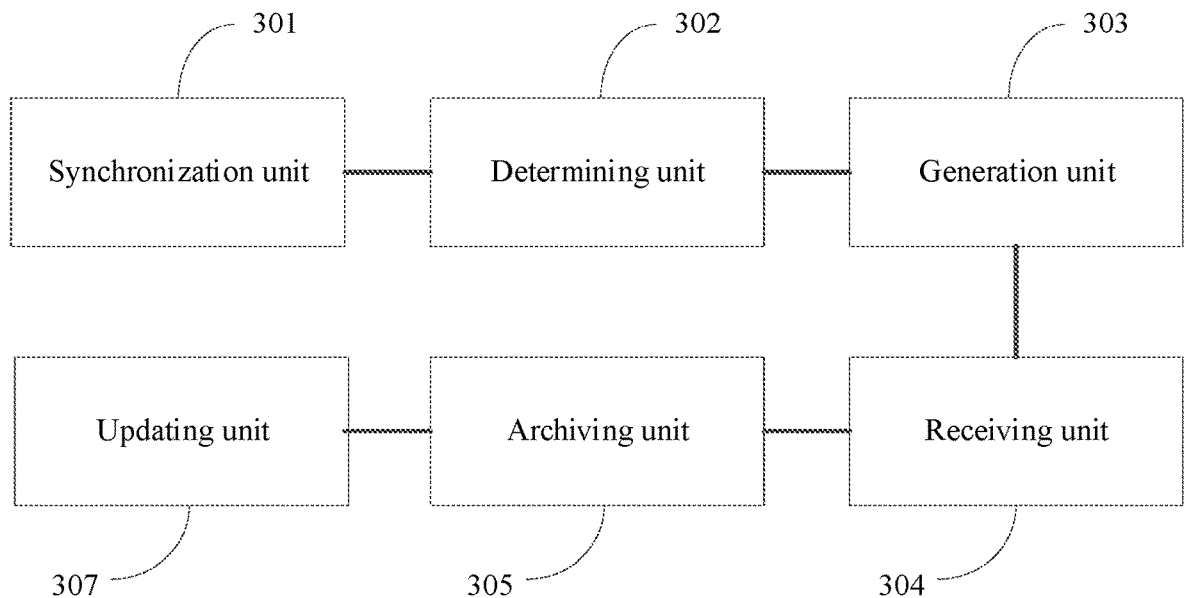
FIG. 15 is a schematic structural diagram of a blockchain data archiving apparatus according to an embodiment of this application.

In some embodiments, in a case that the first committing node is a newly added committing node in the blockchain system, the blockchain data archiving apparatus may further include an updating unit 307, as shown in FIG. 15. The updating unit 307 is configured to: transmit, by the first committing node, a synchronization request to the consensus node in a case that the first committing node is a newly added committing node in the blockchain system, and receive endorsement information and archiving point information transmitted by the consensus node for the synchronization request; obtain, by the first committing node, state data from the second committing node according to the endorsement information and the archiving point information; obtain, by the first committing node, second block data whose block height exceeds the synchronization block height from the consensus node or the second committing node; and update, by the first committing node, the state data according to transaction information in the second block data to obtain current blockchain data of the first committing node.

In some embodiments, the archiving point information includes a root hash value of state data of the consensus node and signature information of the second committing node; and the updating unit 307 is configured to: verify, by the first committing node, the endorsement information and the signature information of the second committing node; determine, by the first committing node, a plurality of leaf hash values corresponding to the root hash value, in a case that the verification of the endorsement information and the signature information of the second committing node by the first committing node is passed; and obtain, by the first committing node, sub-state data corresponding to different leaf hash values in parallel from the second committing node as the obtained state data.

In some embodiments, the updating unit 307 is configured to: classify, by the first committing node, the plurality of leaf hash values according to a quantity of the second committing nodes; determine, by the first committing node, target leaf hash values corresponding to the different second committing nodes according to a result of the classification of the plurality of leaf hash values; and obtain, by the first committing node, sub-state data corresponding to the target leaf hash values from the different second committing nodes.

In some embodiments, the synchronization unit 301 is configured to: transmit, by the first committing node, a synchronization request to the consensus node, the synchronization request including an identity of the first committing node; receive, by the first committing node, a block transmitted by the consensus node for the synchronization request, the block being transmitted by the consensus node after successfully verifying the identity of the first committing node in the synchronization request; and update, by the first committing node, local blockchain data according to the block transmitted by the consensus node, to obtain the synchronized blockchain data.

In some embodiments, the determining unit 302 is configured to: match, by the first committing node, the synchronization block height against an archiving block height; and determine, by the first committing node, the target state data required by the current transaction in the state data, in a case that the synchronization block height matches the archiving block height.

During implementation, each of the foregoing units may be implemented as an independent entity; or may be randomly combined, so as to be implemented as a same entity or several entities. For implementations of the foregoing units, refer to the foregoing method embodiments.

Figure 16:
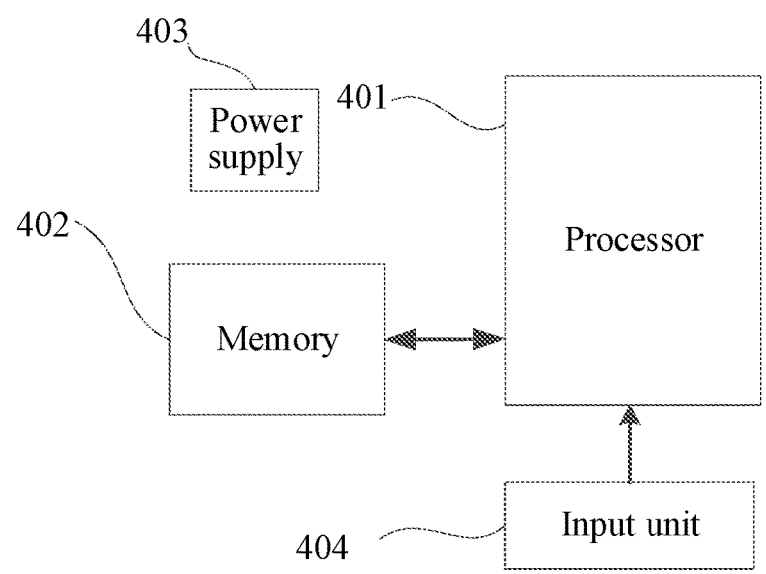
FIG. 16 is a schematic structural diagram of an electronic device according to an embodiment of this application.

An embodiment of this application further provides an electronic device. FIG. 16 is a schematic structural diagram of an electronic device according to an embodiment of this application. The electronic device may include components such as a processor 401 with one or more processing cores, a memory 402 with one or more computer-readable storage media, a power supply 403, and an input unit 404. A person skilled in the art may understand that the electronic device structure shown in FIG. 16 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. Optionally, the processor 401 may include one or more processing cores. Preferably, the processor 401 may integrate an application processor and a modem. The application processor mainly processes an operating system, a user interface, an application program, and the like. The modem mainly processes wireless communication. It may be understood that the foregoing modem processor may not be integrated into the processor 401.

The memory 402 may be configured to store the software programs and modules. The processor 401 runs the software programs and modules stored in the memory 402, to perform various function application and data processing. The memory 402 may mainly include a program storage area and a data storage area. The program storage area may store an operating system, an application program required by at least one function (for example, a voice playing function or an image playing function), and the like. The data storage area may store data created according to use of the electronic device. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. For example, the power supply 403 may be logically connected to the processor 401 by using a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. In this embodiment, the processor 401 in the electronic device may load executable files corresponding to processes of one or more application programs to the memory 402 according to the following instructions, and the processor 401 runs the application program (executable instructions) stored in the memory 402, to implement various functions as follows:

synchronizing, by the first committing node, blockchain data with the consensus node, and determining a synchronization block height of the synchronized blockchain data, the synchronized blockchain data including state data; determining, by the first committing node, target state data required by a current transaction in the state data, and backing up the target state data; generating, by the first committing node, a state data snapshot of the synchronization block height according to the backed-up target state data, and transmitting the state data snapshot, the synchronization block height, and signature information of the first committing node to the second committing node as archiving point information; receiving, by the first committing node, endorsement information of the second committing node for the archiving point information; and archiving, by the first committing node, the synchronized blockchain data according to the endorsement information and the archiving point information. The previous embodiments may be referred to for the implementation of each of the foregoing operations.

Based on the above, in the embodiments of this application, by backing up the target state data required by the current transaction and generating a state data snapshot based on the backed-up target state data, the conflict between the snapshot and the original transaction is solved, and a real-time snapshot of the state data is achieved. In addition, the other committing nodes in the blockchain sign and endorse information such as the state data snapshot, which makes the information credible. Therefore, the efficiency and precision of blockchain data archiving can be greatly improved.

In various embodiments in the present disclosure, a node may refer to a software node, a hardware node, or a combination thereof. A software node may include a computer program or part of the computer program that has a predefined function and works together with other related parts to achieve a predefined goal, such as those functions described in this disclosure. A hardware node may be implemented using processing circuitry and/or memory configured to perform the functions described in this disclosure. Each node can be implemented using one or more processors (or processors and memory). Likewise, a processor (or processors and memory) can be used to implement one or more nodes. Moreover, each node can be part of an overall node that includes the functionalities of the node.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

A person of ordinary skill in the art may understand that, all or some steps of the methods in the foregoing embodiments may be implemented by using instructions (executable instructions), or implemented through instructions controlling relevant hardware, and the instructions may be stored in a computer-readable storage medium and loaded and executed by a processor.

An embodiment of this application provides a computer program product or a computer program. The computer program product or the computer program includes executable instructions, the executable instructions being stored in a computer-readable storage medium. A processor of a computer device reads the executable instructions from the computer-readable storage medium, and executes the executable instructions, to cause the computer device to perform the blockchain data archiving method according to the embodiments of this application.

An embodiment of this application further provides a computer-readable storage medium, storing executable instructions, the executable instructions being loaded by a processor, to implement any one of the blockchain data archiving methods according to the embodiments of this application. The computer-readable storage medium may include: a read-only memory (ROM), a random access memory (RAM), a magnetic disk, an optical disc or the like.

Because the executable instructions stored in the computer-readable storage medium can be used for performing any one of the blockchain data archiving methods according to the embodiments of this application, the executable instructions can achieve the beneficial effects that can be achieved by any one of the blockchain data archiving methods according to the embodiments of this application. For details, reference may be made to the foregoing embodiments.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The blockchain data archiving method and apparatus, the electronic device, and the computer-readable storage medium provided in the embodiments of this application are described in detail above. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application scopes according to the ideas of this application. In conclusion, the content of the specification is not to be construed as a limitation to this application.

What is claimed is:

1. A method for archiving blockchain data, the method comprising:
    synchronizing, by a first committing node comprising a memory storing instructions and a processor in communication with the memory, blockchain data with a consensus node, and determining a synchronization block height of the synchronized blockchain data, the synchronized blockchain data comprising state data, wherein the state comprises a plurality of sub-state data;
    determining, by the first committing node, target state data required by a current transaction in the state data, and backing up the target state data by:
        obtaining, by the first committing node, a block height corresponding to the sub-state data and a storage label corresponding to the sub-state data in a local database;
        adding, by the first committing node, the block height corresponding to the sub-state data to the storage label corresponding to the sub-state data for marking, to obtain a marked storage label;
        selecting, by the first committing node, target sub-state data required by the current transaction from the plurality of sub-state data according to the marked storage label, and
        backing up, by the first committing node, the target sub-state data;
    generating, by the first committing node, a state data snapshot of the synchronization block height according to the backed-up target state data, and transmitting the state data snapshot, the synchronization block height, and signature information of the first committing node to a second committing node as archiving point information;
    receiving, by the first committing node, endorsement information of the second committing node for the archiving point information; and
    archiving, by the first committing node, the synchronized blockchain data according to the endorsement information and the archiving point information.

2. The method according to claim 1, wherein the selecting, by the first committing node, the target sub-state data required by the current transaction from the plurality of sub-state data according to the marked storage label comprises:
    obtaining, by the first committing node, transaction information corresponding to the current transaction;
    determining, by the first committing node, a current block height of current blockchain data of the first committing node according to the transaction information;
    determining, by the first committing node, that a new block exists in the current blockchain data, in a case that the current block height exceeds the synchronization block height;
    selecting, by the first committing node, invocation information required by a transaction in the new block from the current blockchain data, the invocation information being used for indicating the sub-state data to be invoked; and
    selecting, by the first committing node, the target sub-state data from the plurality of sub-state data according to the invocation information and the marked storage label.

3. The method according to claim 1, wherein the generating, by the first committing node, the state data snapshot of the synchronization block height according to the backed-up target state data comprises:
    selecting, by the first committing node, synchronization sub-state data whose block height does not exceed the synchronization block height from the state data, to obtain a synchronization sub-state data set;
    adding, by the first committing node, the backed-up target sub-state data as new synchronization sub-state data to the synchronization sub-state data set to update the synchronization sub-state data set;
    performing, by the first committing node, a hash operation on the synchronization sub-state data in the updated synchronization sub-state data set to generate state data of a target structure; and
    copying, by the first committing node, the state data of the target structure to generate the state data snapshot of the synchronization block height.

4. The method according to claim 1, wherein the archiving, by the first committing node, the synchronized blockchain data according to the endorsement information and the archiving point information comprises:
    determining, by the first committing node, an endorsement quantity of second committing nodes that transmit the endorsement information;
    adding, by the first committing node, the endorsement information to the archiving point information to obtain updated archiving point information, in a case that the endorsement quantity exceeds a quantity threshold;
    transmitting, by the first committing node, the updated archiving point information to the consensus node; and
    in response to the first committing node receiving configuration block data transmitted by the consensus node for the updated archiving point information, archiving, by the first committing node, the synchronized blockchain data.

5. The method according to claim 4, wherein:
the synchronized blockchain data comprises first block data; and
the archiving, by the first committing node, the synchronized blockchain data comprises:
copying, by the first committing node, the updated archiving point information to generate an archiving data snapshot of the first committing node at the synchronization block height,
adding, by the first committing node, the configuration block data to the first block data to obtain updated first block data,
selecting, by the first committing node, target block data whose block height does not exceed the synchronization block height from the updated first block data, and
deleting, by the first committing node, the target block data.

6. The method according to claim 1, wherein the synchronizing, by the first committing node, the blockchain data with the consensus node comprises:
transmitting, by the first committing node, a synchronization request to the consensus node, the synchronization request comprising an identity of the first committing node;
receiving, by the first committing node, a block transmitted by the consensus node for the synchronization request, the block being transmitted by the consensus node after successfully verifying the identity of the first committing node in the synchronization request; and
updating, by the first committing node, local blockchain data according to the block transmitted by the consensus node, to obtain the synchronized blockchain data.

7. An apparatus for archiving blockchain data, the apparatus comprising:
a memory storing instructions; and
a processor in communication with the memory, wherein, when the processor executes the instructions, the processor is configured to cause the apparatus to perform:
synchronizing blockchain data with a consensus node, and determining a synchronization block height of the synchronized blockchain data, the synchronized blockchain data comprising state data,
determining target state data required by a current transaction in the state data, and backing up the target state data by:
obtaining, by the first committing node, a block height corresponding to the sub-state data and a storage label corresponding to the sub-state data in a local database;
adding, by the first committing node, the block height corresponding to the sub-state data to the storage label corresponding to the sub-state data for marking, to obtain a marked storage label;
selecting, by the first committing node, target sub-state data required by the current transaction from the plurality of sub-state data according to the marked storage label, and
backing up, by the first committing node, the target sub-state data,
generating a state data snapshot of the synchronization block height according to the backed-up target state data, and transmitting the state data snapshot, the synchronization block height, and signature information of the apparatus to a second committing node as archiving point information,
receiving endorsement information of the second committing node for the archiving point information, and
archiving the synchronized blockchain data according to the endorsement information and the archiving point information.

8. The apparatus according to claim 7, wherein, when the processor is configured to cause the apparatus to perform selecting the target sub-state data required by the current transaction from the plurality of sub-state data according to the marked storage label, the processor is configured to cause the apparatus to perform:
obtaining transaction information corresponding to the current transaction;
determining a current block height of current blockchain data of the apparatus according to the transaction information;
determining that a new block exists in the current blockchain data, in a case that the current block height exceeds the synchronization block height;
selecting invocation information required by a transaction in the new block from the current blockchain data, the invocation information being used for indicating the sub-state data to be invoked; and
selecting the target sub-state data from the plurality of sub-state data according to the invocation information and the marked storage label.

9. The apparatus according to claim 7, wherein, when the processor is configured to cause the apparatus to perform generating the state data snapshot of the synchronization block height according to the backed-up target state data, the processor is configured to cause the apparatus to perform:
selecting synchronization sub-state data whose block height does not exceed the synchronization block height from the state data, to obtain a synchronization sub-state data set;
adding the backed-up target sub-state data as new synchronization sub-state data to the synchronization sub-state data set to update the synchronization sub-state data set;
performing a hash operation on the synchronization sub-state data in the updated synchronization sub-state data set to generate state data of a target structure; and
copying the state data of the target structure to generate the state data snapshot of the synchronization block height.

10. The apparatus according to claim 7, wherein:
the synchronized blockchain data comprises first block data; and
when the processor is configured to cause the apparatus to perform archiving the synchronized blockchain data, the processor is configured to cause the apparatus to perform:
copying the updated archiving point information to generate an archiving data snapshot of the apparatus at the synchronization block height,
adding the configuration block data to the first block data to obtain updated first block data,
selecting target block data whose block height does not exceed the synchronization block height from the updated first block data, and
deleting the target block data.

11. The apparatus according to claim 7, wherein, when the processor is configured to cause the apparatus to perform synchronizing the blockchain data with the consensus node, the processor is configured to cause the apparatus to perform:

transmitting a synchronization request to the consensus node, the synchronization request comprising an identity of the apparatus;
receiving a block transmitted by the consensus node for the synchronization request, the block being transmitted by the consensus node after successfully verifying the identity of the apparatus in the synchronization request; and
updating local blockchain data according to the block transmitted by the consensus node, to obtain the synchronized blockchain data.

12. The apparatus according to claim 7, wherein, when the processor is configured to cause the apparatus to perform archiving the synchronized blockchain data according to the endorsement information and the archiving point information, the processor is configured to cause the apparatus to perform:
determining an endorsement quantity of second committing nodes that transmit the endorsement information;
adding the endorsement information to the archiving point information to obtain updated archiving point information, in a case that the endorsement quantity exceeds a quantity threshold;
transmitting the updated archiving point information to the consensus node; and
in response to receiving configuration block data transmitted by the consensus node for the updated archiving point information, archiving the synchronized blockchain data.

13. A non-transitory computer-readable storage medium, storing computer-readable instructions, wherein, the computer-readable instructions, when executed by a processor, are configured to cause the processor to perform:
synchronizing blockchain data with a consensus node, and determining a synchronization block height of the synchronized blockchain data, the synchronized blockchain data comprising state data, wherein the state data comprises a plurality of sub-state data;
determining target state data required by a current transaction in the state data, and backing up the target state data by:
obtaining a block height corresponding to the sub-state data and a storage label corresponding to the sub-state data in a local database,
adding the block height corresponding to the sub-state data to the storage label corresponding to the sub-state data for marking, to obtain a marked storage label;
selecting target sub-state data required by the current transaction from the plurality of sub-state data according to the marked storage label, and
backing up the target sub-state data;
generating a state data snapshot of the synchronization block height according to the backed-up target state data, and transmitting the state data snapshot, the synchronization block height, and signature information of a first committing node to a second committing node as archiving point information;
receiving endorsement information of the second committing node for the archiving point information; and
archiving the synchronized blockchain data according to the endorsement information and the archiving point information.

14. The non-transitory computer-readable storage medium according to claim 13, wherein, when the computer-readable instructions are configured to cause the processor to perform selecting the target sub-state data required by the current transaction from the plurality of sub-state data according to the marked storage label, the computer-readable instructions are configured to cause the processor to perform:
obtaining transaction information corresponding to the current transaction;
determining a current block height of current blockchain data of the first committing node according to the transaction information;
determining that a new block exists in the current blockchain data, in a case that the current block height exceeds the synchronization block height;
selecting invocation information required by a transaction in the new block from the current blockchain data, the invocation information being used for indicating the sub-state data to be invoked; and
selecting the target sub-state data from the plurality of sub-state data according to the invocation information and the marked storage label.

15. The non-transitory computer-readable storage medium according to claim 13, wherein, when the computer-readable instructions are configured to cause the processor to perform generating the state data snapshot of the synchronization block height according to the backed-up target state data, the computer-readable instructions are configured to cause the processor to perform:
selecting synchronization sub-state data whose block height does not exceed the synchronization block height from the state data, to obtain a synchronization sub-state data set;
adding the backed-up target sub-state data as new synchronization sub-state data to the synchronization sub-state data set to update the synchronization sub-state data set;
performing a hash operation on the synchronization sub-state data in the updated synchronization sub-state data set to generate state data of a target structure; and
copying the state data of the target structure to generate the state data snapshot of the synchronization block height.

16. The non-transitory computer-readable storage medium according to claim 13, wherein, when the computer-readable instructions are configured to cause the processor to perform archiving the synchronized blockchain data according to the endorsement information and the archiving point information, the computer-readable instructions are configured to cause the processor to perform:
determining an endorsement quantity of second committing nodes that transmit the endorsement information;
adding the endorsement information to the archiving point information to obtain updated archiving point information, in a case that the endorsement quantity exceeds a quantity threshold;
transmitting the updated archiving point information to the consensus node; and
in response to the first committing node receiving configuration block data transmitted by the consensus node for the updated archiving point information, archiving the synchronized blockchain data.

17. The non-transitory computer-readable storage medium according to claim 16, wherein:
the synchronized blockchain data comprises first block data; and
when the computer-readable instructions are configured to cause the processor to perform archiving the synchronized blockchain data, the computer-readable instructions are configured to cause the processor to perform:

copying the updated archiving point information to generate an archiving data snapshot of the first committing node at the synchronization block height, adding the configuration block data to the first block data to obtain updated first block data, selecting target block data whose block height does not exceed the synchronization block height from the updated first block data, and deleting the target block data.

* * * * *